Jan. 16, 1968   M. G. BIENHOFF ET AL   3,364,471
DATA PROCESSING APPARATUS
Filed May 23, 1963   13 Sheets-Sheet 1

Fig. 1

EDWARD J. SCHNEBERGER
MILTON G. BIENHOFF
INVENTORS
BY Samuel Lindenberg
ATTORNEY

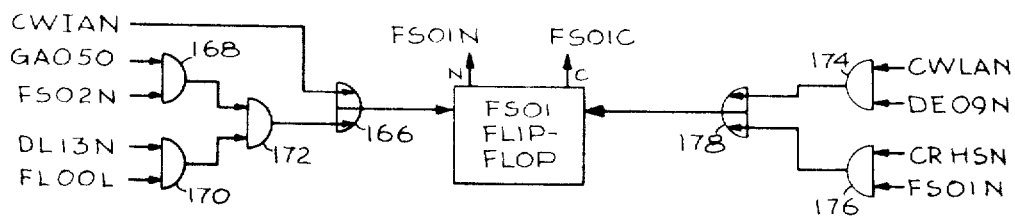
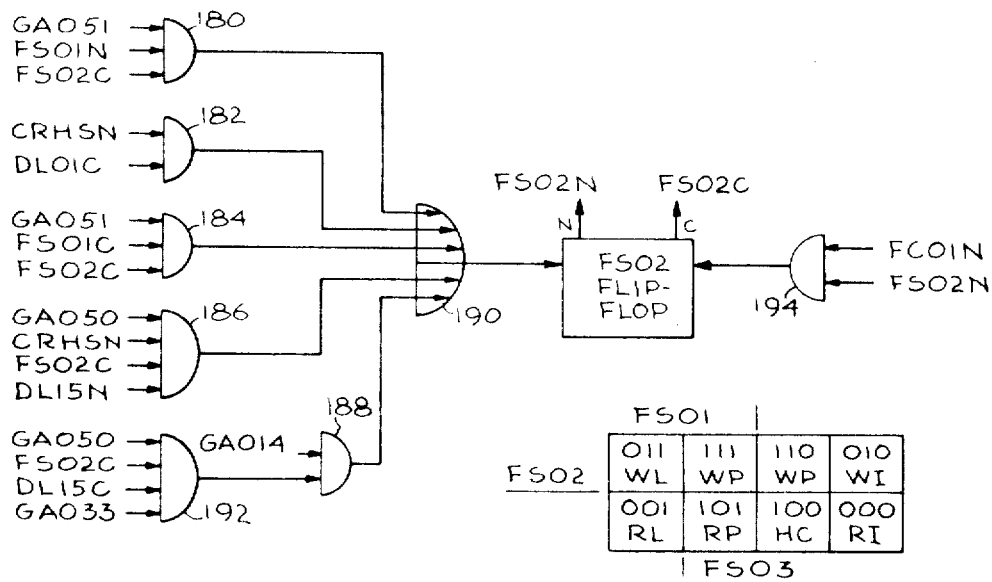
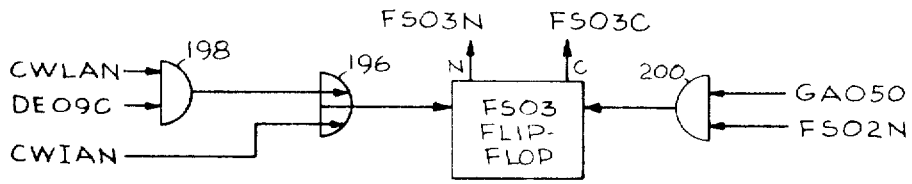
Fig. 2D
EDWARD J. SCHNEBERGER
MILTON G. BIENHOFF
INVENTORS

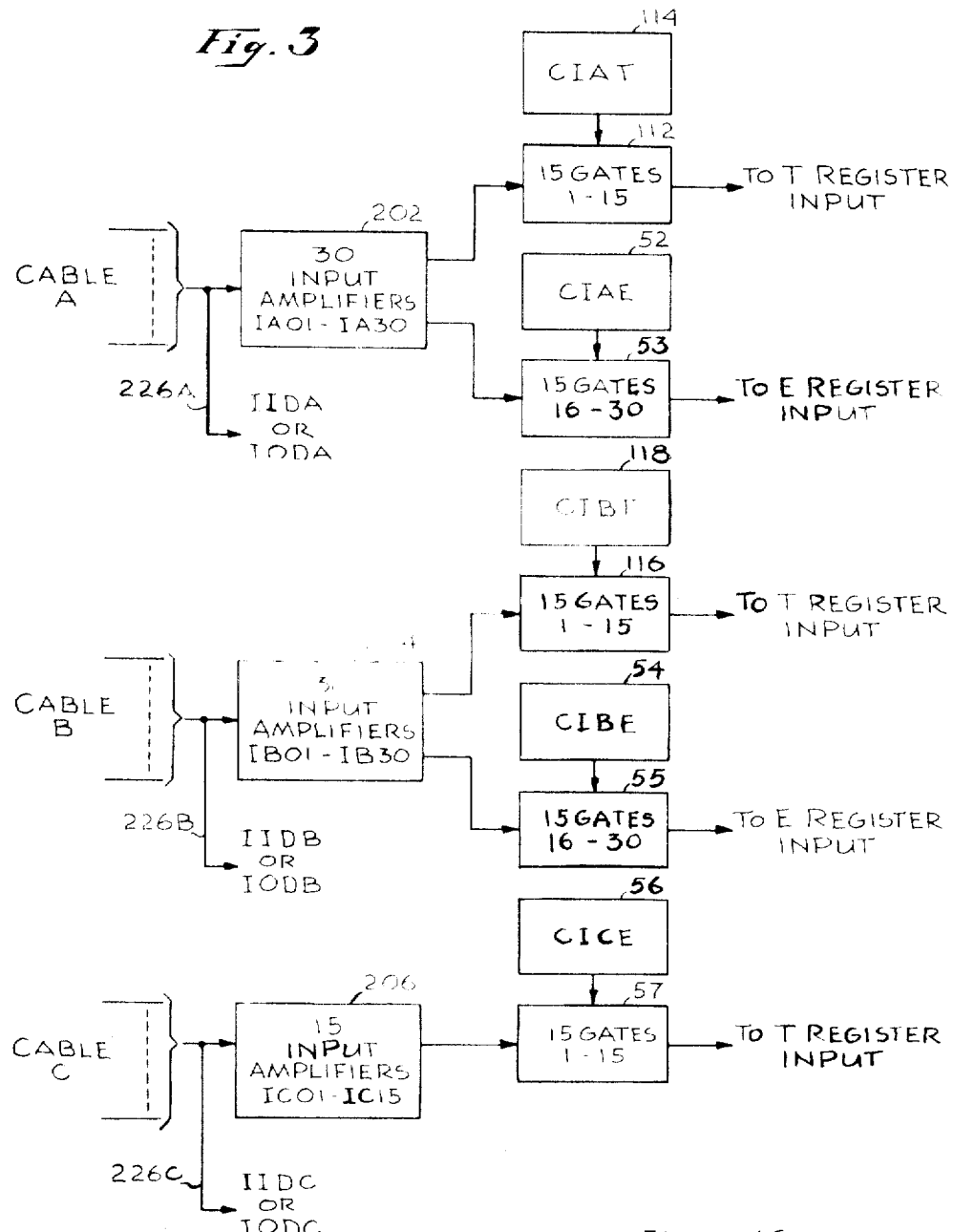

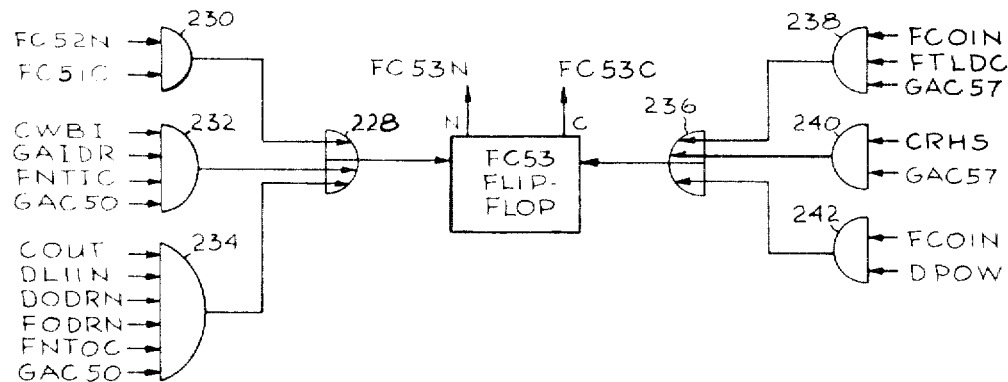
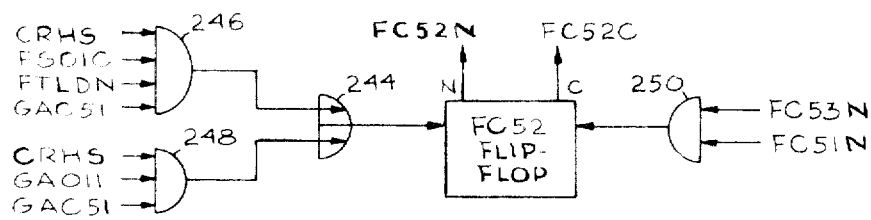
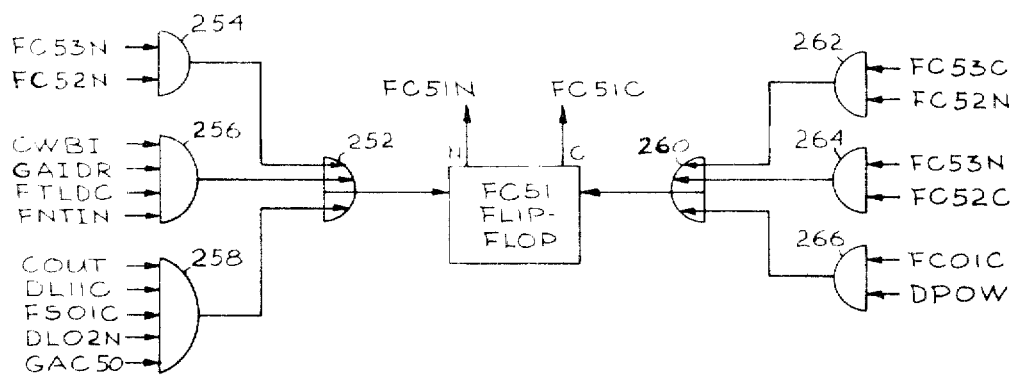
Fig. 4
EDWARD J. SCHNEBERGER
MILTON G. BIENHOFF
INVENTORS

EDWARD J. SCHNEBERGER
MILTON G. BIENHOFF
INVENTORS

BY Samuel Lindenberg
ATTORNEY

Fig. 7
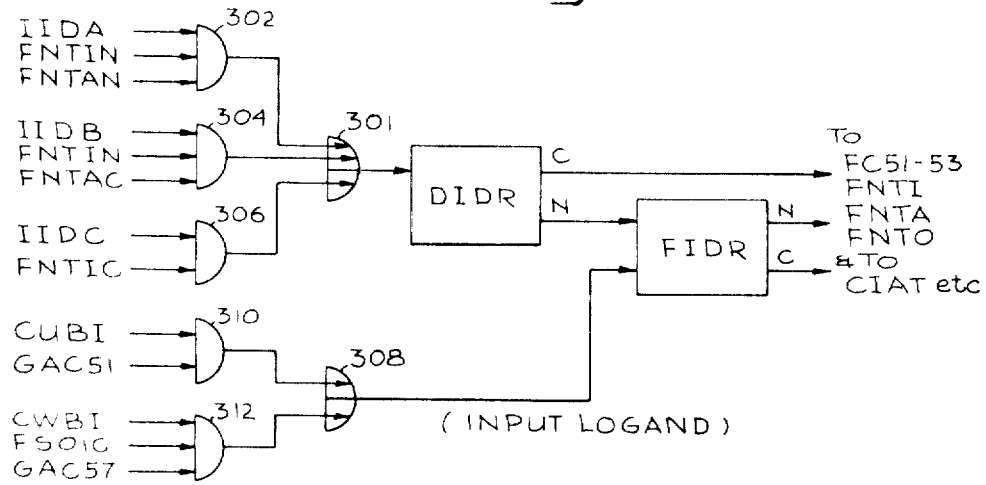
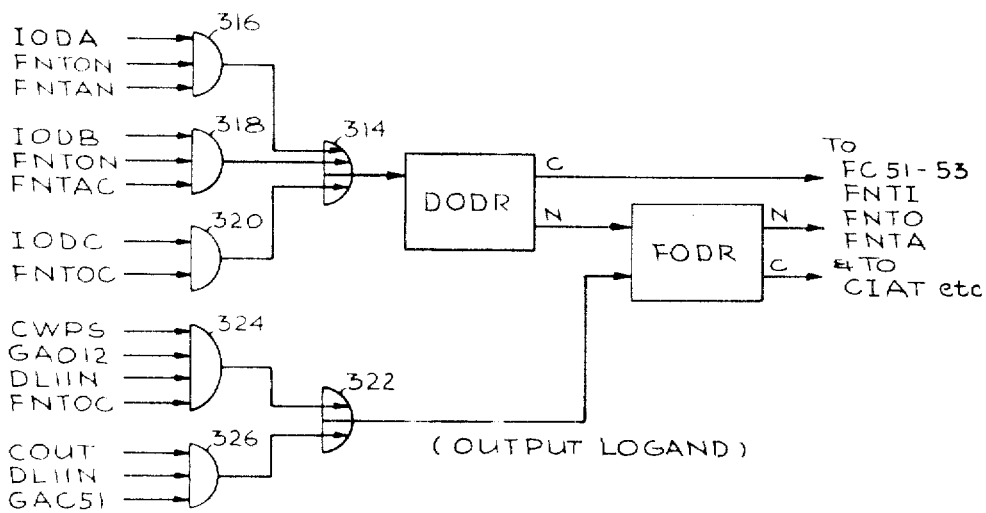
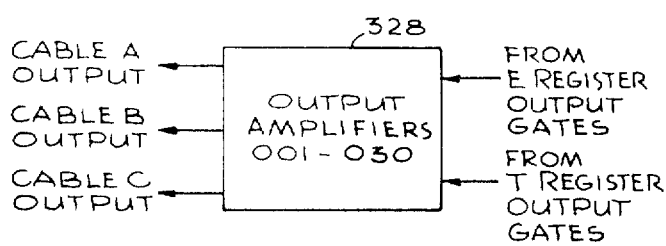

GENERAL FORMAT

Fig. 12A

| PC | AO | SA |
|----|----|-----|

DL15   DL10 DL09   DL07 DL06   DL01

PC - PRIMARY COMMAND
AO - ADDRESS OPTION
SA - SECONDARY COMMAND OR ADDRESS

NORMAL COMMAND WITH SECONDARY COMMAND

Fig. 12B

| PC | AO | CF | SC |
|----|----|----|-----|

DL15   DL10 DL09   DL07 DL06   DL05 DL04   DL01

CF - MEMORY OPTION BITS TO INHIBIT ACCESS
&/OR HOLD COUNT DURING EXECUTION OF
PRIMARY OR SECONDARY COMMAND
SC - SECONDARY COMMAND; MOST SIGNIFICANT TWO
BITS OF COMMAND ARE INTERPRETED AS ONES

NORMAL COMMAND WITH SCRATCHPAD ADDRESS

Fig. 12C

| PC | AO | ADR |
|----|----|-----|

DL15   DL10 DL09   DL07 DL06   DL01

ADR - SCRATCHPAD ADDRESS

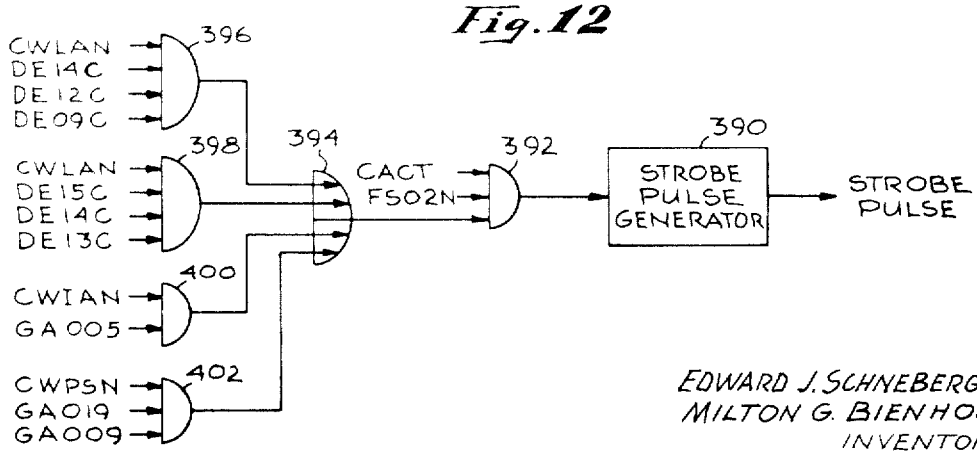

Fig. 12

SPECIAL COMMANDS
TABLE SEARCH
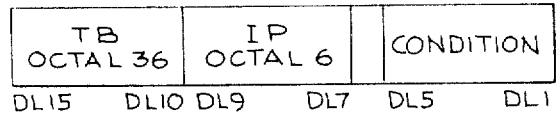
*Fig. 13A*
CONDITIONS
26-EQ  A' = E
36-NH  A' > E
37-NL  A' < E
27-NQ  A' ≠ E
SORT
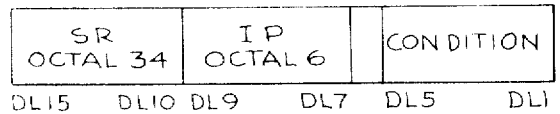
*Fig. 13B*
CONDITIONS
26-EQ  A' = E
36-NH  A' > E
37-NL  A' < E
27-NQ  A' ≠ E
MATCH
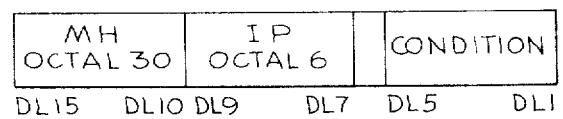
*Fig. 13C*
CONDITIONS
26-EQ  A' = E
36-NH  A' > E
37-NL  A' < E
27-NQ  A' ≠ E
*Fig. 15*
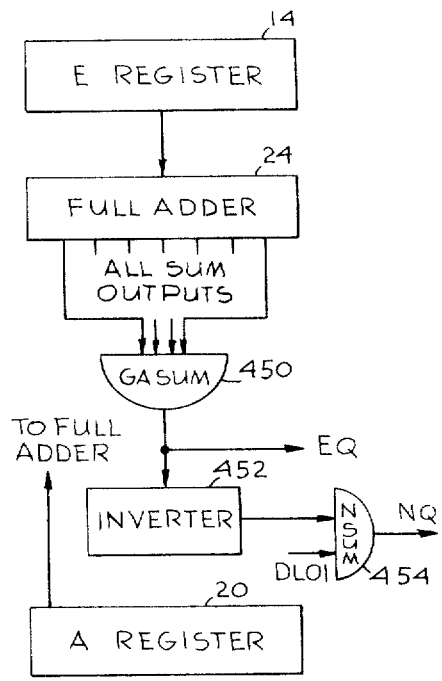
*Fig. 14*
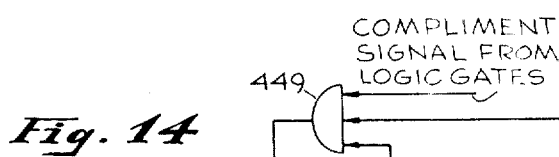
EDWARD J. SCHNEBERGER
MILTON G. BIENHOFF
INVENTORS

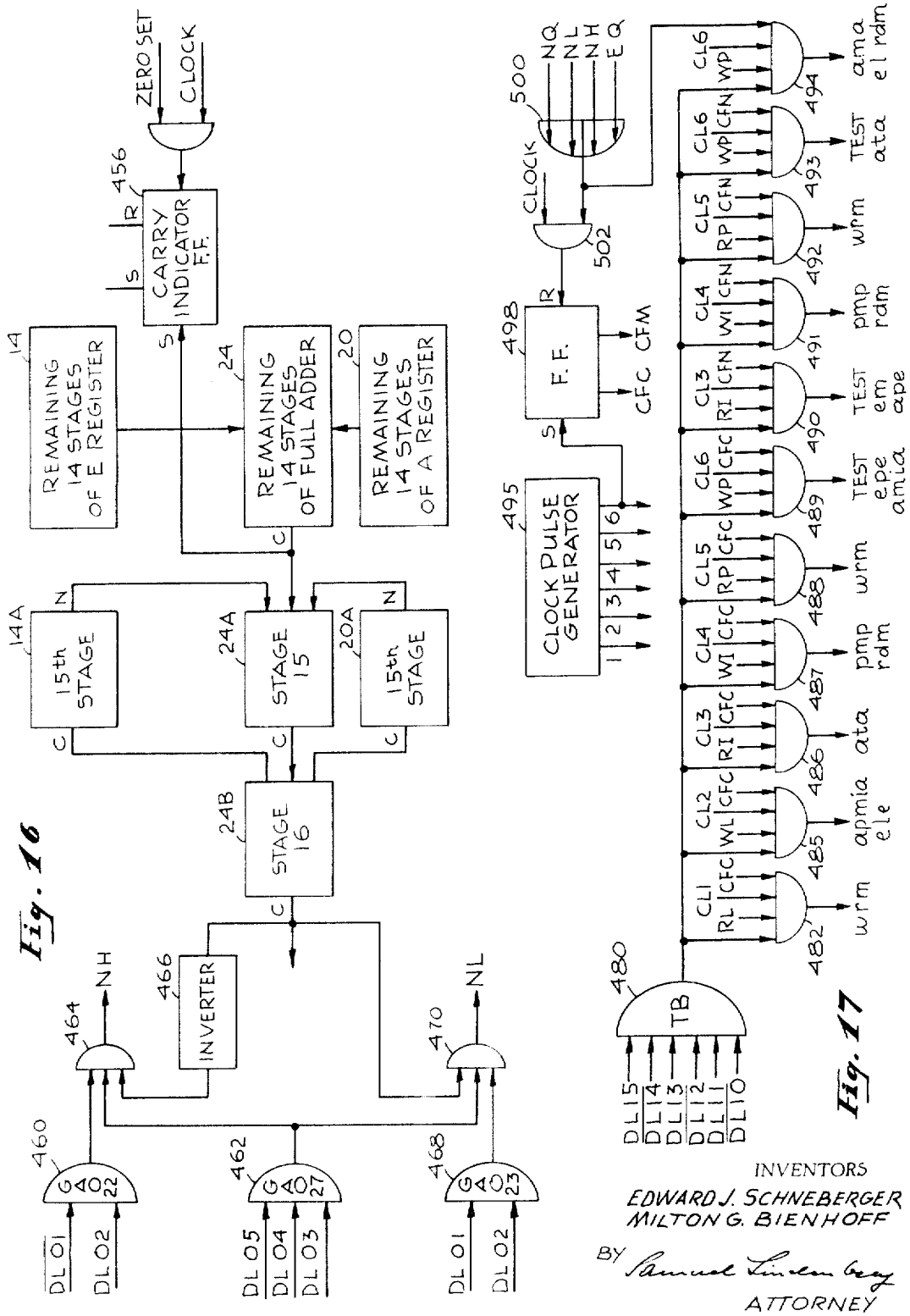

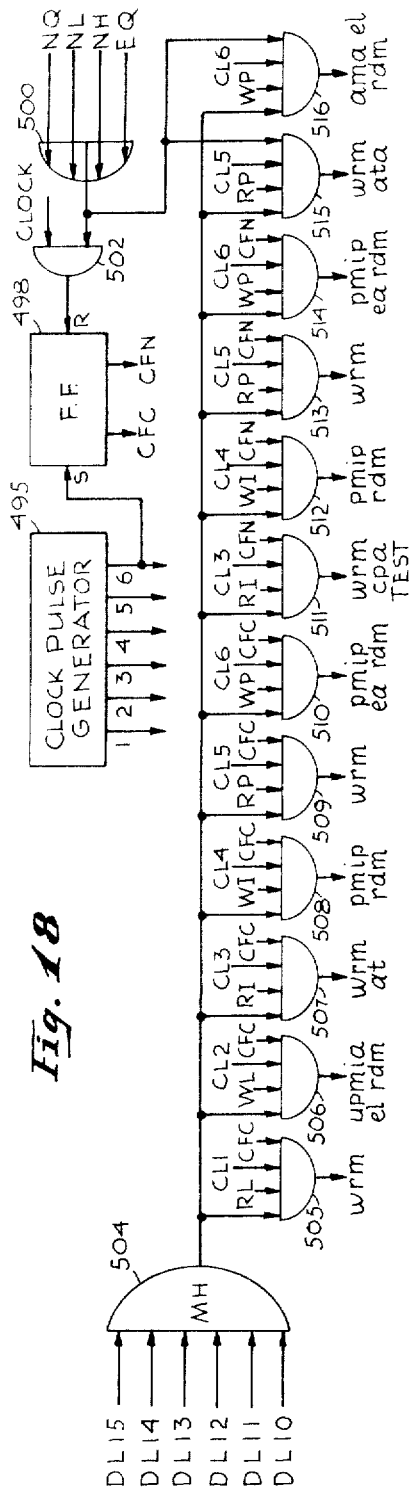
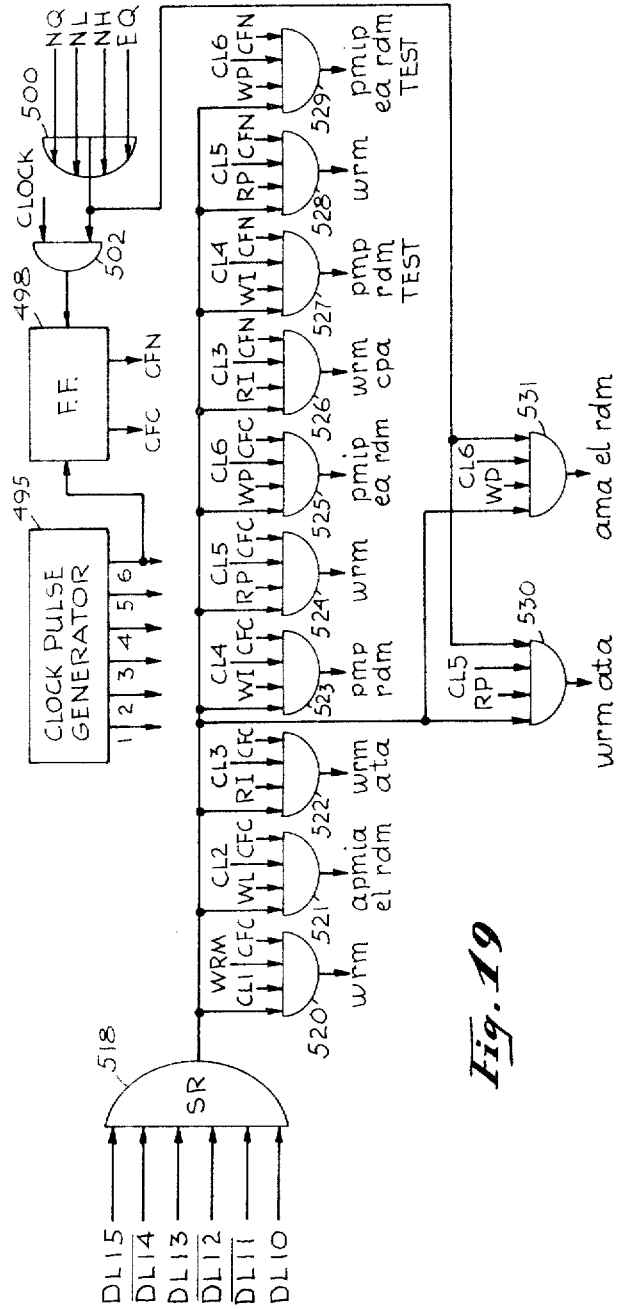
Fig. 18
Fig. 19
INVENTORS
EDWARD J. SCHNEBERGER
MILTON G. BIENHOFF
ATTORNEY

United States Patent Office 3,364,471
Patented Jan. 16, 1968

3,364,471
DATA PROCESSING APPARATUS
Milton G. Bienhoff and Edward J. Schneberger, Canoga Park, Calif., assignors, by mesne assignments, to The Bunker-Ramo Corporation, Stamford, Conn., a corporation of Delaware
Filed May 23, 1963, Ser. No. 282,706
15 Claims. (Cl. 340—172.5)

This invention relates generally to data processing apparatus and more particularly to means for reducing the processing time required to compare a first block of data words with a test word or a second block of words.

In order to perform an operation with conventional computers of the type wherein a sequence of words which are stored in the computer memory are compared to a word held outside of the memory, or two word sequences held in the memory are compared with one another, or where words in a sequence in the memory itself are compared with one another, a rather complicated program has to be written which effectively requires an instruction for practically every step of the operation to be performed. This makes for a rather cumbersome program, and slows the operation of the computer, since it is necessary to read the instruction after each step before performing in response thereto.

An object of this invention is the provision of a computer wherein operations of the type specified may be achieved without the necessity for providing a separate instruction for substantially every step of the operation.

Another object of this invention is the provision of a computer having a structural arrangement which enables the specified operations to be carried out in response to a single command set.

Yet another object of the present invention is the provision of a computer having structural arrangements such that the specified operations may be effectuated simply and rapidly.

Briefly, the invention herein is based on the recognition that in the performance of certain operations by data processing apparatus, considerable processing time can be saved by minimizing the number of memory accesses normally required to perform such operation. More particularly, where each of a plurality of data words stored in memory is to be sequentially compared with a test word or a second plurality of data words, it is recognized that processing time can be saved by accessing only the requisite data words from memory. That is, in response to a single instruction word, the requisite data words are automatically sequentially accessed and compared without requiring that a plurality of instruction words, which together conventionally comprise a subroutine, be accessed.

In a preferred embodiment of the invention a stored logic computer of a type which has been described and shown in an application for a "Stored Logic Computer" by Edward J. Schneberger et al., Ser. No. 164,660, filed Jan. 8, 1962, and assigned to a common assignee is extended to include the present invention. The structural arrangement of this computer is such that the necessary functions of reading out of the computer memory, restoring the information read therefrom, and transferring necessary data read from the memory to registers for the purpose of comparison, and also the function of obtaining the address sequence data in the memory is all carried out in response to a single instruction set. The computer, in response to the instruction set, which is here termed a logand, continues the operation indicated of sequentially comparing words from the memory either with other memory words or with an external word, until the conditions specified within the instruction set is met.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram of a stored logic computer of the type with which this invention may be practiced;

FIGS. 2A, 2B, and 2C are logic block diagrams showing how input signals for the state counter of the computer, as shown in FIG. 2D are derived;

FIG. 3 is a block diagram of the computer input-output circuits;

FIG. 4 is a block diagram of the timing control register used to time input and output data flow;

FIG. 7 is a block diagram of circuits used for control of the input of a word to the computer of the derivation of an output therefrom;

FIG. 12 is a schematic diagram of logic means for generating a stroke pulse;

FIGS. 12A, 12B and 12C are diagrams exemplifying logand formats;

FIGS. 13A, 13B and 13C are diagrams exemplifying logand formats of a type which are used with this invention;

FIG. 14 shows a block diagram for achieving a complementing operation in the A register;

FIG. 15 is a block diagram showing in accordance with this invention an arrangement for indicating the occurrence of two predetermined conditions;

FIG. 16 is a block diagram of an arrangement in accordance with this invention for indicating the occurrence of two other predetermined conditions; and FIGS. 17, 18 and 19 are schematic diagrams showing the logic for collecting signals for respectively initiating table look-up, match, and sort operations.

Figure 2A:
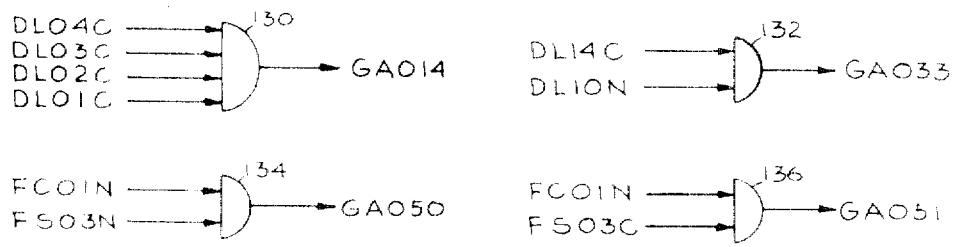
FIG. 2D is a logic block diagram of the state counter which is used in the computer.

For the purpose of understanding this invention it is necessary to understand the operation of a computer of the type referred to in the foregoing application for patent. Accordingly, there follows a description of the computer which is extracted from that application for patent. The logic instructions for the computer which may also be designated as logands are stored in the memory. FIG. 1 is a block diagram of such a stored logic computer. The machine contains a random access memory 10, exemplified as a magnetic core storage memory. Into the memory there may be entered, in advance of the machine functioning to process data, logic instructions or logands which are required to instruct the remainder of the machine how to process data which is entered therein. These logands may consist by way of example, of 15 bits. Groups of these 15 bit logands for achieving a desired set of basic operations are designated as lograms.

In addition to the core memory, the stored logic machine includes six flip-flop registers, each capable of storing 15 bits, by way of example. These registers are designated as an L-register 12, an E-register 14, an M-register 16, a P-register 18, an A-register 20, and a T-register 22. In addition to the registers, the computer contains a 15-bit parallel full-adder 24 and a 15-bit parallel half-adder 26. In addition, the machine has a power supply 27 and a power supply monitor 29, a computer control and maintenance switchboard 28, a control counter 30, a state counter 32, clock-pulse generating circuits 34, and various control circuits for operation of the machine which will be discussed as this description progresses.

The E-register is used principally for holding information read from and/or written into the memory. The E-register also accepts the transfer of 15-bit operands from the L-register, the P-register, the A-register, the T-register, and the M-register via the half-adder 26. Transfers to the E-register from the various other registers are shown by the lines ending in arrows from the respecitve registers, which arrows terminate at the E-register. The logic and gating circuirty required for effectuating a transfer to the E-register is represented by rectangles in the path of these lines. Thus, the transfer of 15 bits of data from the L-register to the E-register is under control of TLE circuits 36. The transfer from the T-register to the E-register is under control of TTE circuits 38. The transfer from the A-register to the E-register is under control of TAE circuits 40. The transfer from the P-register to the E-register requires operation of circuits TPE 42. The transfer from the M-register via the half-adder 26 to the E-register requires the operation of CME circuits 44. In addition, the E-register circulates its contents via control and logic circuits TEE 46.

In addition, the E-register can receive data from input-output equipment 48 through any one of three cables ABC via input-output amplifiers 50. The selection of cable A is under control of CIAE logic circuits 52 and gates 53. The selection of cable B is under control of CIBE logic circuits 54 and gates 55. The selection of cable C is under control of CICE logic circuits 56 and gates 57. The E-register is the only register that receives information directly from the core memory and from which information can be written directly into the memory.

The L-register 12 is used to hold a logand while it is being interpreted by the logic circuits of the computer. The L-register receives its input from the E-register over gating and logic circuits TEL 58. The logand signals in the L-register are the logic signals which in conjunction with other sequencing signals, whose derivation is to be described, direct the operation of the computer. The low-order six bits of the L-register may be employed to address memory locations 0 through 63 of the magnetic-core memory. This portion of the magnetic-core memory is designated as a scratch-pad memory. The scratch-pad section of the memory provides a temporary storage for intermediate results of computation, or logands. The L-register circulates its contents, using the TLL 60 gating and logic circuits. The L-register can address the core memory 10 through addressing and driving circuits, designated as X and Y select-and-write circuits 62. The data entered into the core storage memory 10 is that contained in the E-register 14. Thus, when the memory is addressed by the L-register for the purpose of writing, the data entered into the scratch-pad memory is that data which is in the E-register at the time.

The core storage memory 10 is of a type well known in the art, which consists of a plurality of core planes, in each of which core plane there are magnetic cores disposed in columns and rows. The columns and rows of cores are aligned so that a row coil is coupled to the same row of cores in each core plane. A column coil is coupled to the same column of cores in each core plane. The row and column coils are commonly referred to as X and Y coils. Selection of a correspondingly positioned core in each core plane for the purpose of being driven toward one of its two states of magnetic remanence is achieved by applying current to the X and Y coils coupled to these cores. There is a separate winding for each core plane which is coupled to every coil in the core plane. This is known as an inhibit winding. Those of the cores which it is desired to maintain in the state of remanence opposite to which they would be driven by the excitation of the X and Y cores may be so maintained by simultaneously applying an inhibit-current drive to the inhibit coil for that core plane. The E-register output is applied to inhibit circuits 64, which are operated in conjunction with the X and Y select-and-write circuits for entering or writing into the core storage memory the contents of the E-register in either a location in the scratch-pad memory, whose address is provided by the L-register, or in any location in the memory in an address which is provided by the M-register.

The output of the core storage memory, consisting of a bit of data obtained from each core which is interrogated, is applied to the reading amplifiers 63. The outputs of the reading amplifiers are entered into the E-register through gates 65 under control of strobing pulses provided by strobing circuitry 67. This insures that the output of the cores is read at a time when false reading signals are minimized.

The M-register 16 is used principally for addressing any one of the locations in the core memory. It operates in conjunction with the half-adder 26 to increment an address in the M-register, when so ordered, in order to provide the address of the next logand to be derived from the memory for execution. The M-register output is always applied to the half-adder 26. Whether or not the contents of the half-adder are incremented is determined by DMOO control logic circuits 68. The details of the operation of the DMOO logic circuits will be provided subsequently herein. The half-adder contents are returned to the M-register through logic and gating circuits, designated as TMM 70. The M-register can also receive the contents of the E-register over the TEM logic and gating circuits 72. The M-register can receive the contents of the A-register over the TAM logic and gating circuits 74. The P-register may enter its contents into the M-register over the TPM logic and gating circuits 76.

It was pointed out that the M-register, by controlling the X and Y select-and-write circuits, can provide the address of any location in the core storage memory for the purpose of either reading or writing. By means of the transfer circuitry just described the contents of either the A-register, the P-register, or the E-register, may be substituted into the M-register in place of the contents of the M-register. Thus, the core memory may effectively be addressed by an address within the E, A, or P-registers, as well as an address in the M-register. Furthermore, by transferring the contents of the L or T-register through one of the other registers into the M-register, the memory can be addressed from any one of the registers of the computer.

If desired, the address in the M-register can be transferred to one of the other registers to be held there until the operations specified by the logand read from the substituted address have been carried out, at which time the M-register address can be transferred back.

There is no direct transfer out of data from the M-register. This always occurs thru the half-adder, i.e. from M-register to half-adder to other register. This facility is provided by the control-and-gating circuitry CME 44, whereby the output of the half-adder may be entered into the E-register. The output of the half-adder may be entered into the P-register thru control-and-gating circuitry CMP 89. The M-register contents can be entered into the A-register via the half-adder by the control-and-gating circuitry CMA 82.

Considering, next, the P-register, its contents are circulated by TPP control-and-gating circuitry 84. The contents of the P-register are transferred into the A-register over TPA control-and-gating circuitry 86. The contents of the P-register may be entered into the E-register over the TPE control-and-gating circuitry 40. When required, the contents of the P-register may be shifted right under control of the gating-and-control circuitry 90. The contents of the P-register may be shifted left under control of the gating-and-control circuitry TPF 92.

The contents of the A-register may be entered into the E-register via TAE gating-and-control circuitry 40. The contents of the A-register may be entered into the T-register via TAT control-and-gating circuitry 96. The contents of the A-register may be shifted right under TAR control-and-gating circuitry 98. The contents of the A-register may be shifted left under TAF control-and-gating circuitry 100. The A-register, which may also be designated as an arithmetic register, is used primarily to hold the results of arithmetic operations performed by the adder 24 and some logic operations. The A-register receives its principal inputs from the full adder 24. It may, however, receive its input from other registers, as indicated. The A-register may also transfer its contents into the P-register under control of the TAP control-and-logic circuits 104. The A-register and the P-register may be shifted left or right, either alone or while coupled together. Thus, the P-register may be used as an extension of the A-register for shift multiply-and-divide operations, when required.

The T-register is used principally for transferring data from the computer to the output devices. It may be used for transmission of output, while the rest of the computer proceeds independently. It may accept data from the E-register thru the TET control-and-logic circuits 108. It may accept data from the A-register thru the TAT control-and-logic circuits 96. Data from the T-register may be circulated thru the TTT control-and-logic circuits 106. Data from the T-register may be transferred to the E-register under control of TTE control-and-logic circuit 38. Data from the T-register may be transferred to the A-register under control of the TTA control-and-logic circuits 110. Input to the T-register from the input-output equipment occurs via the input-output amplifiers through gates 112, which also require control signals from CIAT control circuitry 114, or through gates 116, controlled by CIBT control circuitry 118. The gates 112 admit data from an A cable, and the gates 116 admit data from the B cable.

The L, E, M, P, A, and T registers each contains 15 flip-flop circuits, known as delay flip-flop circuits since the output in response to an input signal does not occur until the clock pulse succeeding the one assisting in driving the flip-flop. These flip-flop outputs are designated by the letter "D" followed by the letter designating the register, followed by a number indicating the position in the register followed by an "N" or a "C." N designates that the output is true or normal and C false or complement. Thus DL12N indicates that the twelfth flip-flop of the L-register has a true output. The registers, unless instructed otherwise by a logand, circulate their contents on every clock pulse. Each one of the "T" or "C" transfer logic circuits effectively constitutes 15 coincidence gates having the 15 "true sides" of the delay flip-flops as one input and a transfer signal as a second input. The transfer signal is usually provided by an amplifier, called a control amplifier, which is driven by the logical output of gates which decode the logand in the L-register. Clock signals time the entry of data into the registers.

The very first logand entry into the memory may be by setting switches which are furnished with the computer-control-and-maintenance switchboard 28. The setting of these switches is entered via the TSE gating and control circuits 120 into the E-register. This first instruction is then transferred into the L-register, which, may, in response thereto, control the entry of data into the core storage from the input-output equipment. The instructions or lograms entered into the core storage may thereafter be used for operating the computer.

The control counter 30 is a three-flip-flop counter and therefore may be set in any one of eight different states. It is used for manual control of computer operation from the maintenance panel. The states of interest, in accordance with this invention are the ones which occur when the computer is running. When the three stages of the control counter are in their true states, their respective outputs may be designated as FCO1N, FCO2N and FCO3N. By actuating a switch on the switchboard 28 for operating the computer automatically, the control counter is operated to the state in which all three stages signify their "true" outputs.

Figure 2B:
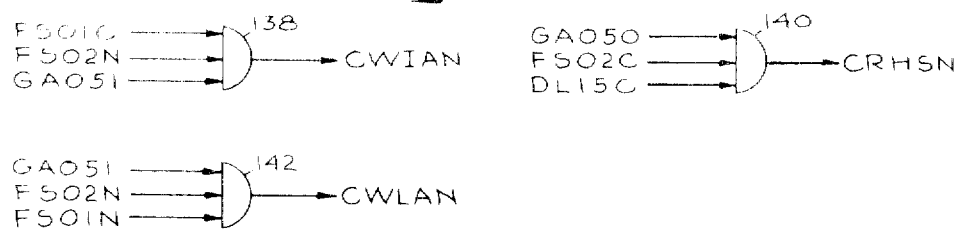
Figure 2C:
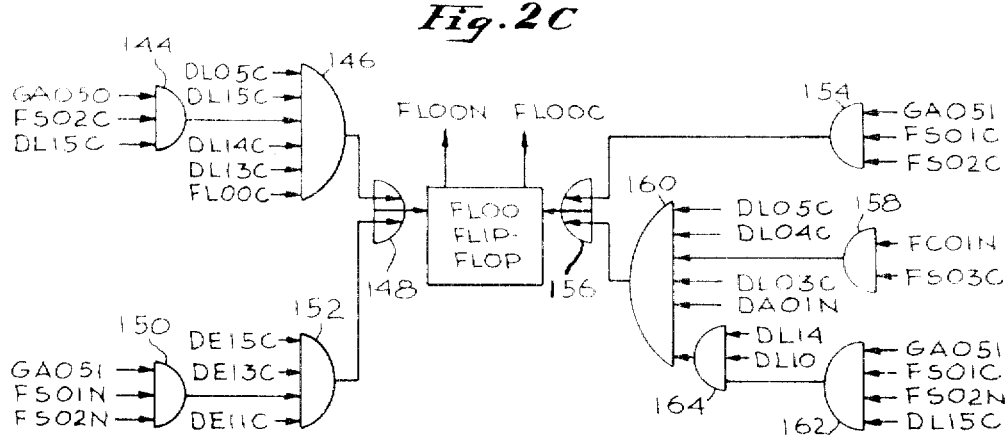

State counter 32 consists of three flip-flop stages; seven distinct control states for the computer are defined by the outputs from this state counter. FIGURE 2D is a block diagram showing the three flip-flop stages, respectively FSO1, FSO2, and FSO3 for the state counter and the logic which sets these flip-flop circuits in its various states. FIGURES 2A, 2B, and 2C are logic diagrams which are used to define some of the input terms in the logic shown in FIGURE 2D. These diagrams illustrate how complex logic control signals are obtained from simple logic signals and are used to simplify the logic required to be shown in FIGURE 2D to actuate the flip-flop stages. Reference is now made to FIGURE 2A, wherein an AND gate 130 provides an output signal, which is designated by GAO14, when all of its inputs are simultaneously present. These inputs are the complement outputs of the first four flip-flop stages of the L-register. These are designated as DLO1C, DLO2C, DLO3C, and DLO4C. The letter "C" designates that the output is the complement, or false output. The letter "N" designates that the output is true, or the normal output.

An AND gate 132 provides an output signal which is designated by GAO33 when both of its inputs, respectively DL14C and DL10N, are present. These are taken from the fourteenth and tenth flip-flops in the L-register. GAO14 and GAO33 exemplify logand decoding. An output signal, designated as GAO50, is derived from an AND gate 134 when its two inputs are simultaneously present. These two inputs are FCO1N and FCO3N. These are the respective true outputs derived from the first and third stages of the control counter. An output designated as GAO51 is derived from an AND gate 136 in the presence of its two inputs. These two inputs are respectively FCO1N and FSO3C. These are the true outputs of the first stage of the control counter and the complement output of the third stage of the state counter.

Referring now to FIGURE 2B, an AND gate 138 provides an output signal designated by CWIAN in the presence of the three inputs, respectively FSO1C, FSO2N, and GAO51. FSO1C is the complement output of the first stage of the state counter, and FSO2N is the true output of the second stage of the state counter. The GAO51 signal is derived from AND gate 136, shown in FIGURE 2A. An AND gate 140 supplies an output designated as CRHSN in the presence of the inputs GAO50, derived from AND gate 134 shown in FIGURE 2A, FSO2C, the complement output of the second stage of the state counter, and DL15C, which is the complement output of the fifteenth stage of the L-register. An AND gate 142 provides an output designated by CWLAN in the presence of inputs GAO51, FSO2N, and FSO1N.

In FIGURE 2C, the logic required to drive a flip-flop designated as FLOO to provide either an output FLOON or FLOOC is shown. An output is derived from an AND gate 144 in the simultaneous presence of inputs GAO50, FSO2C, and DL15C. The output of AND gate 144 is applied to an AND gate 146. The output of the AND gate 146 is applied to the flip-flop FLOO through an OR gate 148. AND gate 146 requires the simultaneous presence of the output of AND gate 144, as well as inputs DLO5C, DL15C, DL14C, and DL13C, and FLOOC, which is the complement output of the FLOO flip-flop.

An AND gate 150 can provide an output to a succeeding AND gate 152 in the simultaneous presence of inputs GAO51, FSO1N, and FSO2N. AND gate 152 can drive flip-flop FLOO through OR gate 148 to provide a normal output in the simultaneous presence of the output of AND gate 150, as well as complement outputs from E-register flip-flop stages DE11C, DE13C, and DE15C. FLOO flip-flop is driven to provide a complement output FLOOC in response to the output of an AND gate 154, which drives the flip-flop through an OR gate 156. The AND gate requires simultaneous inputs, GAO51, FSO1C, and FSO2C.

FLOO may also be driven to provide a complementary output by an alternative logic network. This includes the output of an AND gate 158 having as its input FCO1N and FSO3C. This AND gate output is applied to a following AND gate 160. An AND gate 162 provides an output in the presence of inputs GAO51, FSO1C, FSO2N, and DL15C. Its output drives a succeeding AND gate 164, which can provide an output to the AND gate 160 in the simultaneous presence of inputs DL14 and DL10. AND gate 160 can therefore drive the FLOO flip-flop to its complement output state in the simultaneous presence of the outputs of AND gates 158, 164, DLO5N, DLO4C, DLO3C, and DAO1N. These outputs are respectively derived from the L-register fifth stage, L-register fourth state, L-register third state, and A-register first stage.

Referring now to FIGURE 2D, the logic for driving the state counter flip-flops FSO1, FSO2, and FSO3 may now be understood. The flip-flop FSO1 is driven to provide FSO1N output in response to CWIAN signals (derived from AND gate 138), which are applied to the flip-flop through an OR gate 166. An AND gate 168 provides an output in response to the presence at its inputs of signals GAO50 and FSO2N. An AND gate 170 can provide an output in the presence of simultaneous inputs DL13N and FLOON. The AND gates 168 and 170 drive a succeeding AND gate 172, which can drive flip-flop FSO1 to provide an FSO1N output.

FSO1 flip-flop is driven to provide an FSO1C output by the signals derived from either an AND gate 174 or an AND gate 176, which are applied to the flip-flop through an OR gate 178. AND gate 174 can provide an output in response to a CWLAN input and a DEO9N input. AND gate 176 can provide an output in response to a CRHSN input and an FSO1N input.

The second stage of the state counter, namely, FSO2 flip-flop, can be driven to provide an FSO2N output in response to the output of an AND gate 180, or an AND gate 182, or an AND gate 184, or an AND gate 186, or an AND gate 188. These AND gates are all connected to an OR gate 190, the output of which drives the flip-flop to its normal or true state. AND gate 180 requires the simultaneous presence at its input of signals GAO51, FSO1N, and FSO2C. AND gate 182 requires the simultaneous presence at its input of signals CRHSN, DLO1C. AND gate 184 requires the simultaneous presence at its input of signals GAO51, FSO1C, and FSO2C. AND gate 186 requires the simultaneous presence at its input of signals GAO50, CRHSN, FSO2C, and DL15N. AND gate 188 provides an output in response to an input consisting of signals GAO14 and the output of an AND gate 192. The AND gate 192 provides an output when there are simultaneously present at its inputs the signals GAO50, FSO2C, DL15C, and GAO33.

The FSO2 flip-flop is driven to provide a complement output (FSO2C) by the output of an AND gate 194. This AND gate provides an output in the simultaneous presence of signals FCO1N, FSO2N.

The third stage of the state counter, flip-flop FSO3, is actuated to provide an FSO3N output in response to either a CWIAN signal, which is applied to it through an OR gate 196, or to the output of an AND gate 198. AND gate 198 provides an output in the simultaneous presence of signals CWLAN and DEO9C. The latter signal is the complement output of the ninth flip-flop in the E register. Flip-flop FSO3 is driven to its complement state in response to the output of an AND gate 198. This AND gate provides an output in the simultaneous presence of signals GAO50 and FSO2N.

Also shown on FIGURE 2D is a VEITCH diagram for the counter. The various count states of the counter are designated by binary numbers 000 through 111. Instead of referring hereafter to these counter states by their numerical count condition, they are referred to by letters which are associated with the number in the box. Thus, 000 represents the RI state, 001 the RL state, 010 the WI state, 011 the WL state, 100 the HC state, 101 the RP state, and 110 and 111 the WP state. When combined with GAO51 the WI signal becomes CWIAN. The WL signal becomes CWLAN.

To interpret the VEITCH diagram, regard the HC state (100), directly below the box in which the letters "HC" appear, are found FSO3. Above, to the left and to the right of the box in which "HC" appears, it will be seen that the letters FSO1 and FSO2 do not appear.

The states which the flip-flops assume in order to represent HC may be derived from the VEITCH diagram and also may be represented by a logical equation as follows:

$$HC = FSO3N \cdot FSO2C \cdot FSO1C$$

Taking another example, note RL on the diagram. Looking to the left, to the right and below the RL box, no state counter flip-flop designations are found. Looking above this box, FSO1 may be found. Thus, the states of the state counter stages may be represented by the logical equation:

$$RL = FSO1N \cdot FSO2C \cdot FSO3C$$

It is believed that with the foregoing examples, the use of the diagram to indicate the states of the counter may be easily deduced.

FIGURE 3 is a more detailed block diagram of the input and output circuits of the computer than shown in FIG. 1. These circuits control and synchronize data flow between the computer and external devices. There are three cables, respectively cable A, cable B and cable C, which connect input signals to the computer and remove output signals therefrom. Cable A can have 30 input wires and 30 output wires. Cable B can have 30 input wires and 30 output wires. Cable C can have 15 input wires and 15 output wires. The input wires of cable A are connected to 30 input amplifiers, represented by the rectangle 202. The cable B can have 30 input wires connected to 30 input amplifiers, represented by the rectangle 204. The 15 input wires of cable C are connected to 15 amplifiers, represented by the rectangle 206.

Fifteen of the input amplifiers of cable A are connected to 15 coincidence gates, represented by the rectangle 112. Under the control of the CIAT logic 114, the 15 gates may be enabled to transfer their outputs into the T-register. The remaining 15 amplifier outputs carrying cable A signals are applied to the 15 coincidence gates 212. Under control of CIAE logic 52, these gates can transfer their outputs into the E-register.

The output of 15 of the 30 input amplifiers 204 of cable B are connected to 15 gates 116. Under control of the CIBT logic and circuits 118, these 15 gates can transfer their outputs into the T-register. Fifteen coincidence gates 55, when activated by CIBE logic 54, can transfer the signals on the remaining 15 input amplifiers of cable B into the E-register.

The 15 wires of cable C are amplified by the 15 input amplifiers and applied to 15 coincidence gates 57. When CICE logic circuits 56 activate these gates, their contents can be transferred into the T-register.

The structure of the logic circuits CIAT, CIAE, CIBT, CIBE, and CICE will be made clear subsequent herein. Computer control signals are generated in response to control signals received from external devices (not shown) which can direct the input-output circuit to connect the computer input channel to one of the three input cables and to connect the computer output channel to one of the output cables. In this manner, the computer may be switched to an input-output device, which is thereby prepared to receive or transmit data. The transfer of data is always accomplished by word or block logands initiated by the control logic of the computer. Direction of transfer specified by the word or the block logand selects either the input or the output channel. As indicated above, cables A and B can input thirty bits into the T and E-registers, followed by a transfer from the T-register to the E-register. Output is from the T and E-registers after transfer from the E-register to the T-register. Cable C always inputs to the E-register and outputs from the T-register.

In addition to the data lines which comprise cable A, cable B, and cable C, each cable will also have at least one control line, respectively designated by 226A, 226B, and 226C, on which external signals can be applied. An external signal, on each line, for example respectively designated by IIDA, IIDB, or IIDC, indicates that a data word is available for input to the computer. Another external signal, respectively designated as IODA, IODB, and IODC, indicates that a peripheral device is ready to accept a word of data.

Figure 5:
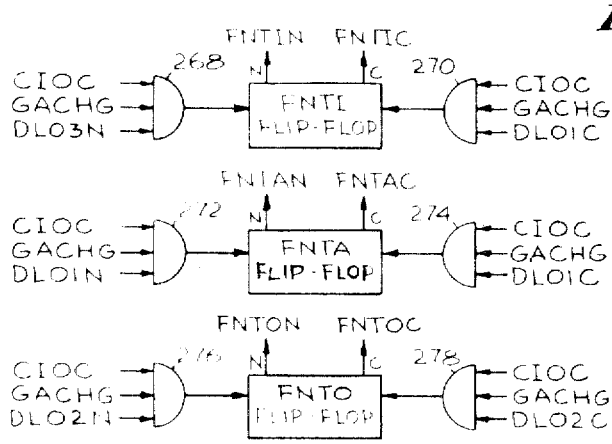
FIG. 5 is a block diagram of a register used to designate the proper input or output channel for the computer.

To control the various timing sequences necessary for data inputs and outputs, a three-bit register, called a timing register, is provided. This register is shown in FIGURE 4. The register is made up of three flip-flop circuits, respectively FC51, FC52, and FCC53. Flip-flop 53 may be driven to the state wherein its normal output is activated by signals applied thereto through an OR gate 228. Or gate 228 is actuated by the output from either an AND gate 230, and AND gate 232, or an AND gate 234. AND gate 230 provides an output in the simultaneous presence of the complementary output of flip-flop FC51, and the normal output of flip-flop FC52. AND gate 232 provides an output in the simultaneous presence at its input of signals CWBI, GAIDR, GAC50, and FNTIC. The method of achieving these signals from basic logic signals is generally represented in FIGURES 2A, 2B, and 2C of the drawings. However, the specific combinations required for producing these signals is set forth in detail in a list of logical equations, which is shown subsequently herein. The FNTIC signal is the complement output of an FNTI (flip-flop, which is shown in FIGURE 5.

AND gate 234 provides an output in the simultaneous presence of signals COUT, DL11N, DODRN, FODRN, FNTOC, and GAC50. The DL11N signal is the normal output of the eleventh flip-flop in the L-register. The FNTOC signal is derived from the complementary output of an FNTO flip-flop shown in FIGURE 5. The FODRN and DODRN signals are the normal signals obtained from the respective DODR and FODR flip-flops shown in FIGURE 7. The COUTC signals and GAC50 signal derivation will be shown subsequently in the list of logical equations to be provided herein.

FC53 flip-flop is driven to provide a complementary output by the output of an OR gate 236. OR gate 236 is driven by the output of either AND gate 238, AND gate 240, or AND gate 242. AND gate 238 is driven in the simultaneous presence of signals FCOIN, FTLDC, and GAC57. AND gate 240 is driven in the simultaneous presence of signals CRHS, and GAC57. AND gate 242 is driven in response to the simultaneous presence of signals FCOIN and DPOW. The source of the input signals to AND gates 238, 240, and 242, not yet shown, will be shown subsequently herein.

The FC52 flip-flop is driven to provide a normal output from the output of an OR gate 244. This OR gate may be driven in response to the output of either AND gate 246 or AND gate 248. AND gate 246 provides an output in the simultaneous presence at its input of signals CRHS, FSO1C, FTLDN, and GAC51. AND gate 248 provides an output in the simultaneous presence at its input of signals CRHS, GAO11, and GAC51.

The FC52 flip-flop is driven to provide a complement output signal by the output of an AND gate 250. This AND gate provides an output signal in the simultaneous presence of signals FC53N and FC51N.

FC51 flip-flop is driven to provide a normal output signal from the output of an OR gate 252. This OR gate is driven by the output of either AND gate 254, 256, or 258. AND gate 254 is driven in response to the simultaneous presence at its inputs of signals FC53N and FC52N, AND gate 256 is driven in response to the simultaneous presence at its input of signals CWBI, GAIDR, FTLDC, and FNTIN. AND gate 258 is driven in the simultaneous presence of signals COUT, DL11C, FSO1C, DLO2N, and GAC50.

Flip-flop FC51 is driven to provide a complement output by the output of an OR gate 260. The OR gate 260 is driven in response to the output of an AND gate 262 or an AND gate 264, or an AND gate 266. AND gate 262 is driven upon the application to its input simultaneously of the outputs of FC53C and FC52N. AND gate 264 is driven in response to the simultaneous application to its input of outputs FC53N and FC52C. AND gate 266 is driven in response to the simultaneous application to its inputs of signals FCO1C and DPOW.

The input and output cables which are selected are determined by the output signals of three flip-flops, respectively FNTI, FNTA, and FNTO. The FNTI flip-flop is driven to provide a normal output in response to the output of an AND gate 268. This AND gate has its output energized in the simultaneous presence of signals CIOC, GACHG, and DLO3N. AND gate 270 is employed to drive the FNTI flip-flop to provide a complement output. AND gate 270 has its output energized upon the simultaneous presence at its input of the signals CIOC, GACHG, and DLO1C.

The FNTA flip-flop is driven to provide a normal output signal by the output of an AND gate 272. This AND gate is driven in response to the simultaneous presence of signals CIOC, GACHG, and DLO1N. Flip-flop FNTA is driven to provide a complement output by the output of an AND gate 274. This AND gate must simultaneously receive signals CIOC, GACHG, and DLO1C in order to drive the FNTA flip-flop. The FNTO flip-flop is driven to provide a normal output in response to output from an AND gate 276. This AND gate is driven in response to the simultaneous presence of signals CIOC, GACHG, and DLO2N. An AND gate 278 drives flip-flop FNTO to provide a complement output. This AND gate requires input signals CIOC, GACHG, and DLO2C.

The A cable input and output wires are used for FNTAN, FNTIN, FNTON signals. FNTAC, FNTIN and FNTON call for B cable input and B cable output. FNTAN, FNTIN and FNTOC call for A cable input and C cable output. FNTIN, FNTAC and FNTOC call for B cable input and C cable output. FNTAN, FNTON and FNTIC call for C cable input and A cable output. FNTAN, FNTIC and FNTOC call for C cable input and C cable output.

Figure 6:
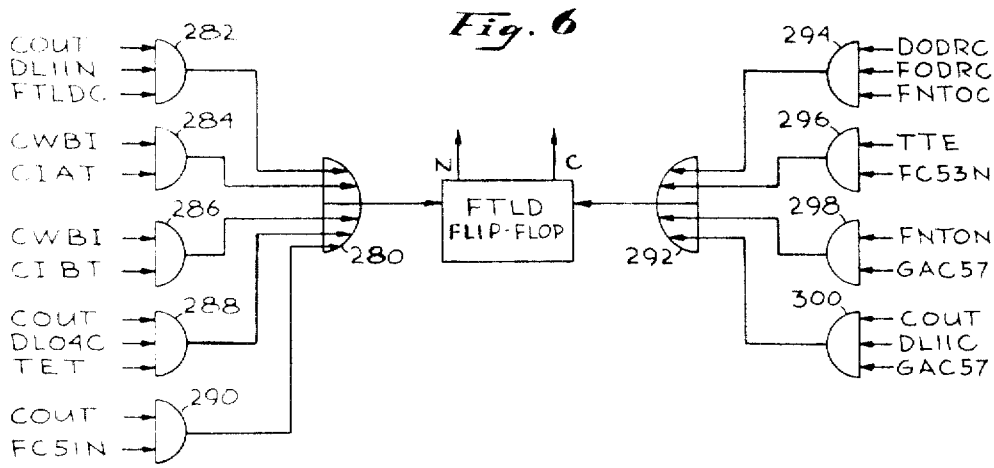
FIG. 6 is a block diagram of a flip-flop and its associated logic circuit which is employed for indicating the availability of the T register of the computer.

FIGURE 6 is a block diagram of an FTLD flip-flop whose outputs are used to indicate to the channel-designation register and timing-control register when the T-register is in use. If the T-register is in use, it can be used for further input or output. The FTLD flip-flop is driven to provide an N-output by the output of an OR gate 280. This OR gate is driven by the outputs of any one of four AND gates, respectively 282, 284, 286, 288, and 290. AND gate 282 is driven upon the simultaneous application to its inputs of signals COUT, DL11N, and FTLDC. The AND gate 284 is driven in response to the application to its input simultaneously of signals CWBI and CIAT. AND gate 286 is driven in response to the application to its input of signals CWBI and CIBT. AND gate 288 provides an output in response to the simultaneous input of signals COUT, DLO4C, and TET. AND gate 290 provides an output in response to the application to its input simultaneously of signals COUT, and FC51N.

The flip-flop FTLD is driven to provide a complement output by the output from an OR gate 292. This OR gate is driven in response to an output from any one of AND gates 294, 296, 298, and 300. AND gate 296 requires at its input signals DODRC, FODRC, and FNTOC before it provides an output. AND gate 296 requires at its input simultaneously signals TTE and FC53N before it can provide an output. AND gate 298 has its output energized in the presence simultaneously of input signals FNTON and GAC57. AND gate 300 has its output energized in the simultaneous presence of signals COUT, DL11C, and GAC57. In the logical equations to be set forth subsequently herein, the derivation of all these signals applied to actuate the FTLD flip-flop, which are not yet shown, will be set forth. For example, the GAC57 signal is derived from the simultaneous presence of signals FC53C, FC52C, and FC51N. These signals are derived from the timing control register shown in FIGURE 4.

FIGURE 7 is a block diagram of other flip-flop circuits which are employed in controlling the input and output data requests. The outputs of the flip-flops DIDR and FIDR are applied to the timing-control register and channel-designation register shown in FIGURES 4 and 5, in response to input and output data-request signals. Flip-flop DIDR is driven to provide a normal output by the output of an OR gate 301. This OR gate is driven in response to the output of either AND gate 302, 304, or 306. The AND gate 302 requires as input signals a data signal IIDA, received from line 226A, and FNTIN and FNTAN signals. These are the normal outputs of flip-flops FNTI and FNTA, shown in FIGURE 5.

AND gate 304 requires a simultaneous application of input signals IIDB, FNTIN, and FNTAC, to provide an output. AND gate 306 requires simultaneous input of signals IIDC and FNTIC. Flip-flop DIDR returns to the state at which it provides a complement output in the absence of any input signals. The normal output of flip-flop DIDR drives flip-flop FIDR to provide a normal output. The complement output of flip-flop FIDR is obtained in response to an "input" logand being applied to its reset input. This input logand consists of signals CWBI and GAC5, which are applied to an AND gate 310. The output of AND gate 310 can drive an OR gate 308, which in turn can drive the FIDR flip-flop to provide a complement output. Another AND gate 312 can also drive OR gate 308 in response to the application to its input of signals CWBI, FSOIC, and GAC57. The DODR flip-flop is driven to provide a normal output by an OR gate 314. The OR gate 314 is driven in response to outputs from any one of AND gate 316, 318, or 320. AND gate 316 provides an output in the simultaneous presence of inputs IODA, FNTON, and FNTAN. AND gate 318 provides an output in the presence of simultaneous inputs IODB, FNTON, and FNTAC. AND gate 320 provides an output in the simultaneous presence of inputs IODC and FNTOC.

DODR flip-flop returns to its complement state when no signals are applied from the OR gate 314. The normal output of flip-flop DODR drives flip-flop FODR to provide a normal output. Flip-flop FODR is driven to provide a complement output when an output logand is applied to its input through an OR gate 322. OR gate 322 is driven by either an AND gate 324 or an AND gate 326. The AND gate 324 can be driven in response to the application to its input of signals CWPS, GAO12, DL11N, and FNTOC. AND gate 326 can be driven by the application to its input of signals COUT, DL11N, and GAC51.

The DIDR, FIDR, DODR and FODR flip-flops provide output signals to the channel designation and timing control registers as well as to the control logic CIAT, CIAE, CIBT, CIBE, CIBE and CICE.

For handling the output signals from the E and T-registers 30 output amplifiers 328 are provided. Fifteen of these receive output from the E-register output gates, and the remaining 15 receive output from the T-register output gates. The 30 output amplifiers are connected to the 30 output lines of both cable A and cable B. The 15 output amplifiers allocated to the T-register are also connected to the 15 output lines of cable C.

Figure 8:
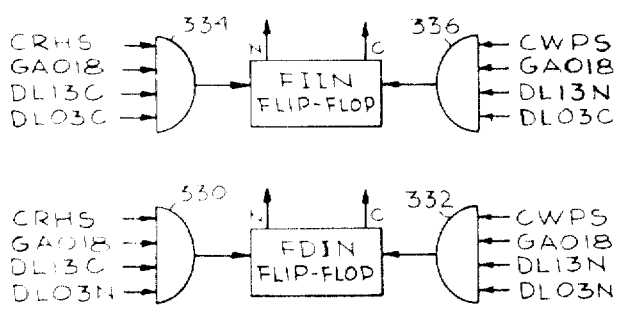
FIG. 8 is a block diagram of flip-flops and logic required for interrupt routines.

Two more flip-flops are employed in the input-output control portion of the computer. These are shown in FIGURE 8 and are, respectively, flip-flops FIIN and FDIN. Flip-flop FDIN provides a normal input when it has been signaled that there is an interrupt routine to be performed by a signal over a line associated with one of the input cables. The FDIN flip-flop provides its normal output until the interrupt routine is completed and prevents further recognition of any data interrupts during this interval. The FIIN flip-flop prevents interruption of the interrupt routine. The FDIN flip-flop provides a normal output in response to an input from an AND gate 330. This AND gate requires input signals CHRS, GAO18, DL13C, and DLO3N before it provides an output. The FDIN flip-flop is driven to provide a complement output in response to the output from an AND gate 332. This AND gate is driven in response to signals CWPS, GAO18, GL13N, and DLO3N.

Flip-flop FIIN is driven to provide a normal output in response to the output of an AND gate 334; this AND gate provides an output in response to input signals CRHS, GAO18, DL13C, and DLO3C. Flip-flop FIIN is driven to provide a complement output in response to the output of AND gate 336; this AND gate provides an output in response to signals CWPS, GAO18, DL13N, and DLO3C.

Summarizing briefly, operation of the input-output circuits serves to control and synchronize data flow between computer and external devices. Control signals from the external devices together with computer control signals direct the selection of which of three input cables are selected for data input and which of three output cables are selected for data output. Input data requests are applied to flip-flops FIDR and DIDR and are thence communicated to the timing counter FC51–FC53 and flip-flops FNTA, FNTI and FNTO together with logand signals from the computer to open the gates which select the cables. Output data requests are applied to flip-flops FODR and DODR and are thence communicated to the timing counter FC51–FC53 and flip-flops FNTA, FNTI and FNTO together with logand signals from the computer to open the gates which select the cables.

Figure 9:
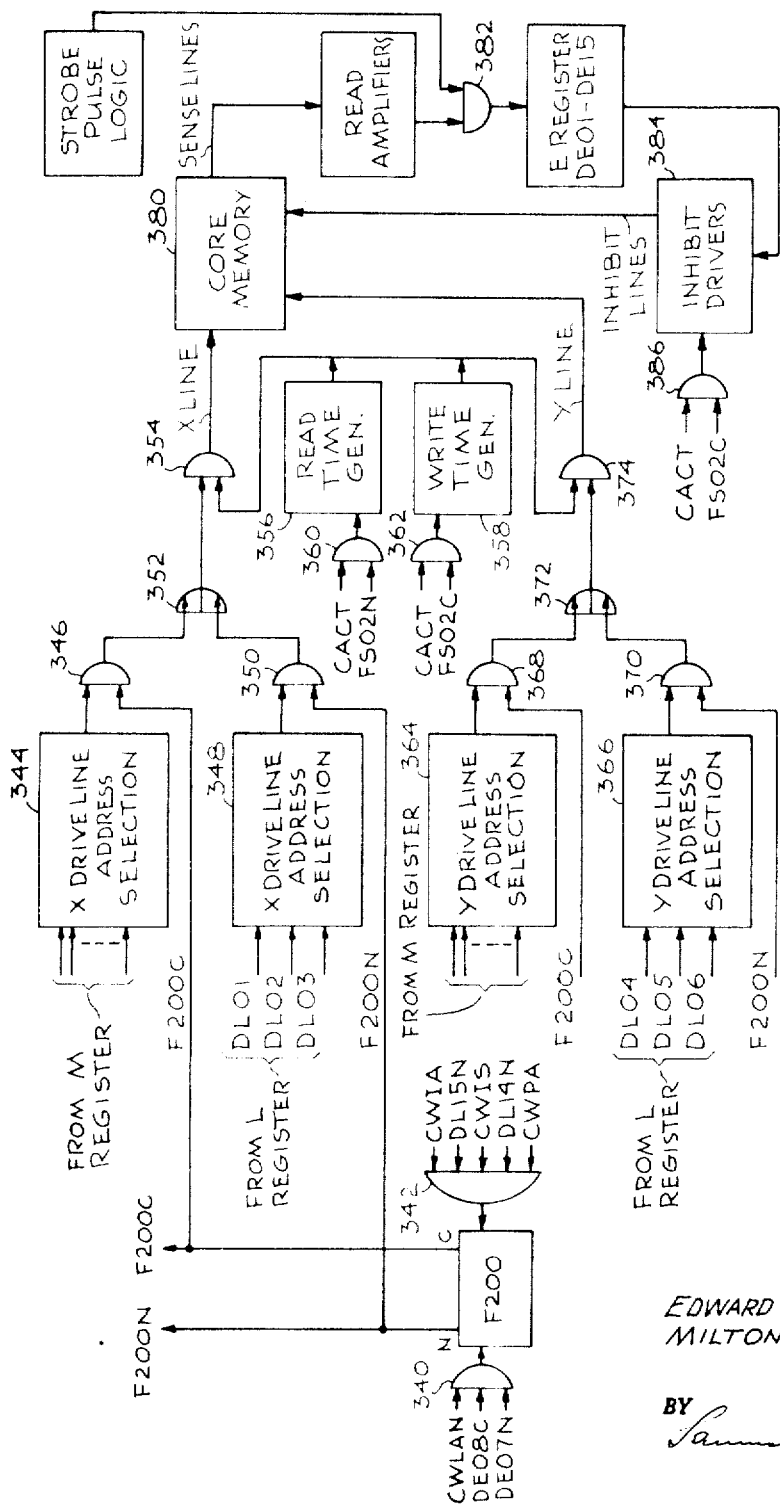
FIG. 9 is a block diagram showing the memory read and write circuits which operate in response to either L or M register address.

Reference is now made to FIGURE 9, which shows a block diagram of the arrangement employed for addressing the core memory from either the L-register or the M-register. The determination as to which of these address's controls is the function allocated to the output of a flip-flop designated as FZOO. This flip-flop provides a normal outuput in response to the application of signals CWLAN, DEOAC, and DEO7N, which are applied to an AND gate 340. The output of this AND gate is applied to the FZOO flip-flop. Another AND gate 342 can drive this flip-flop to provide a complement output in response to the simultaneous application to its input of signals CWIA, DL15N, CWIS, DL14N, and CWPA.

The address outputs from the M-register are applied to X-drive-line address-selection logic 344. The selected address-output line connects to an AND gate 346. This AND gate provides an output when it receives a FZOOC signal from the flip-flop FZOO. The L-register address outputs are also applied to X-drive-line address-selection circuits 348. The selected X-line address is applied to an AND gate 350, which has as its other required input an output from the FZOON side of the flip-flop FZOO. The outputs of AND gate 346 and 350 are applied to an OR gate 352. The OR gate output is applied to a driving AND gate 354. This AND gate is enabled to drive the core memory selected X-line for reading from a reading-timing generator 456 or for writing from a writing-timing generator 358. The reading-timing generator is driven by the output of an AND gate 360, which response to signals CACT and FSO2N. The writing-timing generator responds to the output of an AND gate 362, which provides an output when the timing signals CACT and FSO2C are applied to its input.

Two Y-drive-line address-selection circuits, effectively 364 and 366, are provided. The Y-drive-line address-selection circuits are addressed from the M-register and the selected address is applied to an output AND gate 368. This AND gate is enabled in the presence of the FZOOC signal. The Y-drive-line address-selection circuits 366 are addressed from the L-register. The output is applied to an AND gate 370. This AND gate is enabled in the presence of the FZOON signal from the flip-flop. The output of AND gates 368 and 370 are applied to an OR gate 372. The OR gate output is applied to an AND gate 374. This AND gate is driven in response to the output of the OR gate 372, and signals from either the read-timing generator 356 or the write-timing generator 358. The AND gate 374 output drives the selected Y-lines to the core memory 380.

It was described previously herein that the coincidence of the X- and Y-drives cause a core in each core plane to be driven. A sense line threaded through each core plane detects whether the output of the driven core is a P or an N signal. The sense lines are connected to read amplifier 380. The output of each one of the read amplifiers is applied to an AND gate 382. Strobing-pulse logic 389 enables these AND gates 382 to transmit the signal applied to their inputs at a time which is determined by the logic shown in FIGURE 12. This interval is selected in order to minimize the effect of any stray signals which can give a false reading signal. The output of the gates 382 is applied to the E-register to drive the delay flip-flops DE01 through DE15 therein to states representing the information read out of the core memory.

The E-register output is applied to 15 inhibit drivers 384. These inhibit drivers are enabled to drive inhibit lines in the presence of an output from an AND gate 386. This AND gate is enabled by logic signals CACT and FSO2C being applied to its inputs. Each one of the inhibit lines is threaded through an entire core plane of the memory 380. The address of the data which has been read into the E-register is again applied to the respective X- and Y-drive-line selection circuits, which drive the selected X and Y lines in a direction so that the core at each core plane coupled to the driven X and Y lines will be driven to one of its states of remanence. This will occur except in those core planes in which an inhibit line is excited. This excited inhibit line will prevent the core from being driven by the X and Y drive lines.

Accordingly, in the foregoing description, it has been shown that the M- or L-register can address the memory, as determined by the output of the FZOO flip-flop. As soon as data has been read out of the core memory into the E-register, it is read back into the core memory to restore the logand which, in the process of reading, has been destroyed.

FIGURE 12 is a block diagram of the strobing-pulse logic 389. A strobing-pulse generator 390 is enabled to produce a strobe-pulse output upon receiving an energizing signal from an AND gate 392. The AND gate receives the output of an OR gate 394 at its input, as well as signals CACT and FSO2N. The OR gate 394 is enabled by the output of any one of AND gates 396, 398, 400, and 402. AND gate 396 can provide an output in the simultaneous presence of signals CWLAN, DE14C, DE12C, and DEO9C. AND gate 398 can produce an output in the simultaneous presence of signals CWLAN, DE15C, DE14C, and DE13C. AND gate 400 can produce an output in the simultaneous presence at its input of signals CWIAN and GAOO5. AND gate 402 can produce an output upon the simultaneous application to its input of signals CWPSN, GAO19, and GAOO9.

Figure 10:
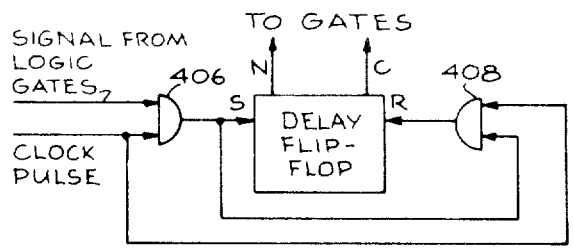
FIG. 10 is a block diagram of a delay flip-flop used to make up a register.

It has been indicated herein that each one of the L, M, P, E, A, T registers contains fifteen delay flip-flops. FIGURE 10 is a block diagram of a typical delay flip-flop and its associated logic. The delay flip-flop 404 can comprise any well known flip-flop circuitry which has two inputs, respectively set and reset, and has two stable states. In response to an input applied to its set terminal, it will transfer, after a short delay, to one of the stable states at which it provides an "N" or normal output. In response to an input applied to its reset terminal, it applies a "C" or a complement output. An AND gate 406 drives the delay flip-flop to provide an "N" output upon receiving a clock pulse from the clock-pulse generator of the computer and also a signal from the output of any one of the computer logic gates which drive this flip-flop.

AND gate 204 output is applied to the set input terminal of the delay flip-flop, and also is applied as an inhibit input to a gate 408. Another input to gate 408 is the output of the clock-pulse generator. The output of the gate 408 is applied to the reset terminal of the delay flip-flop. In the presence of a signal from the computer logic gates and a clock pulse, the output of AND gate 406 drives the delay flip-flop to provide a normal output and inhibits gate 408 from passing the clock pulse. When no signal is received from the logic gates of the computer, but a clock pulse is received, then the clock pulse is applied through gate 408 to the reset input of the delay flip-flop which is reset so that it provides a "complement" output. Accordingly, in the embodiment of the invention, the registers can change their contents on each clock pulse, unless instructed to the contrary.

Figure 11:
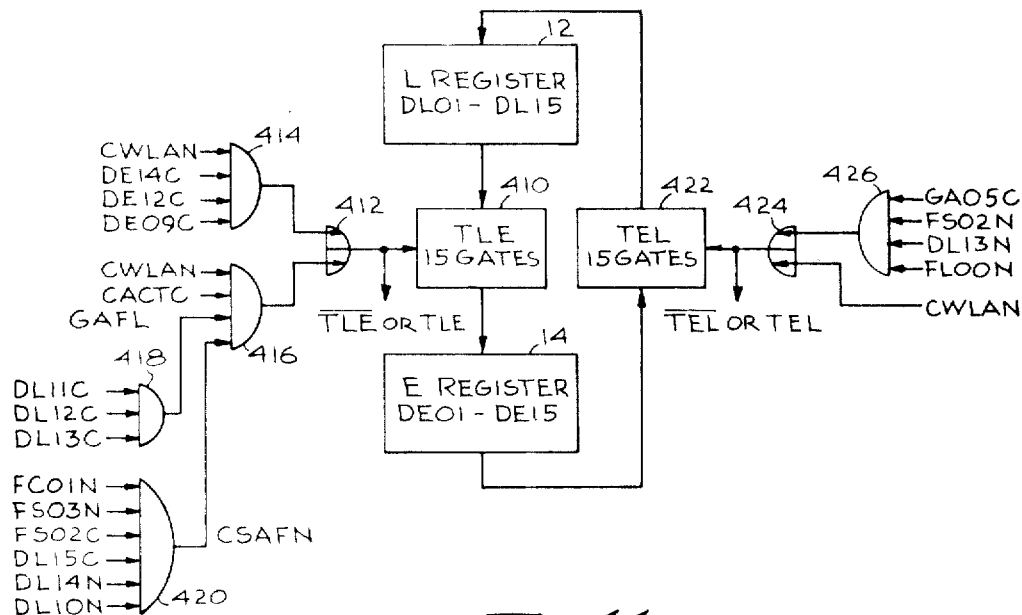
FIG. 11 is a block diagram of a logic control transfer from the L to the E register and from the E to the L register.

FIGURE 11 is a block diagram illustrating a typical logic controlled transfer of the type which is employed herein for transfers between the various registers. There is shown by way of example a transfer from the E-register to the L-register and from the L-register to the E-register. The "N"-output of each delay flip-flop in the L-register is applied to a different one of 15 gates. These are represented by the TLE rectangle 410 (transfer from L to E-register). Each one of these 15 gates applies its output to a different one of the gates 406 (shown in FIG. 10) of the 15 delay flip-flops in the E-register 14. The TLE gates 410, however, are not able to transfer the L-register outputs until an enabling signal is received from an OR gate 412. This OR gate can apply the required output in the presence of an input from any one of AND gates, respectively 414 or 416. The AND gate 414 provides an output in the simultaneous presence of input signals CWLAN (see FIGURE 2B) and the ninth, twelfth, and fourteenth stage complement outputs of the E-register. AND gate 416 can provide an output in the simultaneous presence of input signals CWLAN, CACT, GAFL and CSHFN. The GAFL signal is derived by applying the complement outputs of the eleventh, twelfth, and thirteenth stages of the L-register to an AND gate 418. The output CSHFN is derived from signals FOO1N, FSO3N, FSO2C, DL15C, DL14N and DL10N being applied to an AND gate 420. AND gates 418 and 420 have their outputs applied to AND gate 416.

The transfer of the contents of the L-register to the E-register can be represented by the following logical equation:

TLE=CWLAN·DE14C·DE12C·DEO9C+CWLAN·
  DE15C·DE14C·DE13C+DL11C·DL12C·DL13C·
  FCO1N·FSO3N·FSO2C·DL15C·DL14N·DL10N

In the equation provided, the symbolism is that commonly employed in logic equations. The "·" joins the "and" terms and the "+" joins the "or" terms.

A transfer of the contents of the E-register into the L- register can take place through the 15 gates, designated as TEL 422 (transfer E to L-register). These gates have their inputs connected to the respective normal outputs of the 15 delay flip-flops in the E-register. These gates are enabled in the presence of an output from an OR gate 424. This OR gate can provide an output, either in the presence of a CWLAN signal or in the presence of an output from an AND gate 426. This AND gate is actuated in the simultaneous presence of signals, respectively GAO5O (see FIGURE 2A), FSO2N, DL13N, and FLOON (see FIGURE 2C). This operation of the TEL gates can be also written as a logical equation as follows:

TEL = CWLAN + GAO5O·FSO2N·DL13N·FLOON

The output of the OR gate 412 which enables the TLE transfer can be taken as a TLE signal. When no TLE transfer is taking place, then the output of the OR gate is a $\overline{TLE}$ signal (not TLE). Similarly the output of OR gate 412 in the presence of a TEL transfer is a TEL signal, and in the absence of such transfer is a $\overline{TEL}$ signal. The logic for all the register transfers will be given subsequently herein. It will be readily understood from the foregoing example and those skilled in the art will have no difficulty with its mechanization.

It has been pointed out that control of this computer is achieved through elementary instructions or operands called logands (for logical commands), which are stored in the memory. The logands are each 15 binary bits in length and occupy a single location in the memory. The logands are read from the memory, interpreted in the E and L-registers, and executed to carry out the operation specified. The logands may be stored anywhere in the memory and are normally executed as sequential clusters of logands.

The general logand format is indicated in FIGURE 12A of the drawings. A logand is divided into fields. Stages 10 through 15 of the L-register hold the primary-command portion of the logand. Primary commands fall into two general classes. One class, designated as regular primary commands, is represented by octalcodes 40 through 77. The second class designated as special primary commands is represented by octalcodes 00 through 37. Each different primary command determines the interpretation to be given to the remainder of the logand. Logands containing regular primary commands are designated as regular logands, and those containing special primary commands are designated as special logands.

The address option field usually occupies the seventh through the ninth stages of the L-register. The secondary command or address usually occupies the first through the sixth stages of the L-register. Logands which contain regular primary commands have one or the other of the formats shown in FIGURES 12B and 12C. The format shown in FIGURE 12B is used for address options designated by DM, DP, DA, IM, IP, and IA. The logand format used in FIGURE 3C is employed for address options designated by DP and IL.

The address option (AO) is a three-bit code which determines the source of the address to be used in addressing operands in the memory. This is used in controlling flip-flop FZOO. Such an address is referred to as the target address. The address option DL, which is specified by the octalcode 1 in the AO-field portion of the logand, specifies that the target address is taken from the low-order six bits of the logand (in the L-register) being executed. This option provides a means for addressing locations 0 through 63 of the memory. These 64 locations are referred to as scratch pad, since they are useful for storing intermediate results of data-processing by the computer.

The IL address option specifies that the target address is to be obtained from the scratch-pad location called for in bits 1 through 6 of the logand. This is an indirect address option.

The DM address option, represented by the octalcode zero, specifies that the target address should be taken from the M-register. At the time that the memory is accessed, the M-register contains an address which is one greater than that of the logand currently being executed. Thus, since the current logand is in location M, the target address will be $M+1$.

The IM address option is represented by the octalcode four. This specifies that the target address is the contents of the memory location immediately following the logand. Thus, if the current logand is in location M, the target address will be $M+1$.

The DP address option, represented by octalcode two, and the IP address option, represented by the octalcode six, respectively designate that the target address is taken from the P-register or that the target address is taken from the memory location whose address is held in the P-register. Similarly, the DA and IA address options, respectively represented by the octalcodes three and seven, specify that the target address should be taken from the A-register or that the target address should be taken from the address located in the A-register.

In FIG. 12B, CF specifies the control field. This portion of the logand constitutes a two-bit code which controls the accessing of the memory and the incrementing of the target address with a regular logand. If $CF=0$, the memory will be accessed, either to read an operand from memory or to write an operand in memory, and the target address will be incremented. If $CF=1$, memory accessing takes place, but incrementing of the target address is inhibited. If $CF=2$, no memory accessing takes place, and the target address is incremented. If $CF=3$, both accessing and incrementing are inhibited.

Referring back to FIGURE 1, it was indicated in the description thereof that the half-adder would increment the address in the M-register when the DMOO flip-flop provided a normal output (or DMOON). Otherwise the M-register address was not incremented. The half-adder always adds the address in the M-register of the output of the DMOO flip-flop. The logic signals which control the DMOO flip-flop are shown subsequently herein. The DMOO flip-flop is maintained in its complement state unless ordered to its normal state. The output of the half-adder is transferred out as instructed from the logand to be replaced by a new sum of the address in the M-register and the output of the DMOO flip-flop.

It should be noted that the full-adder, like the half-adder, always has available the sum of its inputs. The full-adder inputs are the contents of the A and E-register. This sum, upon instruction, can be gated into the A-register.

The states assumed by the state counter, which are shown in FIGURE 2D, are significant in the operation of the memory also. The states of the counter and the functions allowed in response thereto are as follows:

RL state (read logand)—the logand in the memory—is read into the E-register. WL state (write logand)—the logand in E-register—is rewritten into the memory (to restore the original contents). RI state (read indirect address)—when specified by a logand, an indirect address is read from a memory address located in L, M, P, or A registers. WI state (write indirect address)—the indirect address read from the memory during RI—is restored into the memory. RP (execute primary command)—the primary command (in the most significant part of the logand) is executed; i.e., multiply the number in the E-register by the number in the P-register. HC state (hold control)—the machine is held for an input or output, i.e., send the results of the multiplication to the tape punch. WP state (write operand)—execute secondary command (the operand for the arithmetic or other operation is restored into the memory or, if called for by the logand, the secondary command is executed).

There are four sequential paths which the state counter may take. For any logand, except a data processing logand, the sequence is from WP to RL to start the cycle; then to WL, where an alternate path exists. This alternate path depends upon the address option in a logand. For a direct-address option, the sequence is from WL to RP; for an indirect-address option, the sequence is from WL to RI.

After an indirect address is obtained from the memory, the original memory contents (for that address) are restored during the WI state. Whenever a word is read from the memory, that word must immediately be rewritten, since the memory cores are always altered upon readout sensing.

The RP (execute primary command) can then be entered, either from the WL state or the WI state, depending on whether the address option is direct or indirect. The alternate exit from the RP state is for an input or an output (to the HC state—hold control) or to WP state, to write the operand (obtained from the memory) back ino the memory, or to execute a secondary command, if called for by the logand.

For a data-processing logand, the sequence is from WP to RI to WI; then to RP and WP, as described above.

It has been indicated that there are two types of primary command, the load type (octalcodes 44–47, and 54–77) and the store type (octalcodes 40–43, and 50–53). In both types of primary commands the target address to be used in accessing the memory and the incrementing of the target address are determined by the address option and the control field respectively. Some examples of regular primary commands are shown below:

Octalcode:
```
75 _____ Load A.
62 _____ Load P.
70 _____ Load T.
72 _____ Load M.
55 _____ Replace A.
47 _____ Replace P.
45 _____ Replace T.
66 _____ Replace M.
64 _____ Exchange A and P, exchange A and T.
```

The register-loading operations specify a transfer of the content of the E-register to the respective A or P or T or M registers. The specified replace operations call for the contents of the E-register to be entered into the contents of the specified register and the contents of the specified register to be entered into the E-register. The exchange operations specified should be clear. It should be noted that these commands are by way of example, and are not exclusive. These are known as load-type commands. An example of store-type commands is shown in the following table:

```
52 _____ Store E
50 _____ Store A
42 _____ Store P
40 _____ Store T
51 _____ Hold A
43 _____ Hold P
41 _____ Hold T
53 _____ Hold M
```

The store-type commands call for the transfer of the contents of the register specified into the E-register. The contents of the register from which the transfer is made (except in the case of the E-register) are lost. The hold-type commands specified call for the contents of the specified register to be transferred to the E-register, and the contents of the E-register to be transferred to the specified register.

If the DL or IL address option is used in a regular logand, the secondary field of the logand (bit position 1 through 6) will be interpreted as a scratch-pad address. If any other address option is used (DM, DP, DA, IM, IP, or IA), bit positions 1 through 4 of the logand are generally used for a secondary command. Like the primary command, the secondary command selects one or more explicit basic operations. These operations are generally initiated on a clock pulse following the explicit operation selected by the primary command—that is, on clock pulse 4 of the direct-address option cycle or on clock pulse 6 of the indirect-address option cycle. The following table exemplifies secondary commands.

Octalcode:
```
00 _____ No operation.
15 _____ Load A.
02 _____ Load P.
10 _____ Load T.
12 _____ Load M.
06 _____ Exchange A and P.
04 _____ Exchange A and T.
```

When a load primary command is specified together with a DL (scratch pad) address option, the sequence which occurs, as a result of clock pulses, logic decoding and state counter advance, is as follows (assuming a logand has been just previously entered into the E-register):

CLOCK 1

Rewrite the contents of E-register (logand) back into memory to restore the original logand in the memory, under M-register control.

CLOCK 2

A. Increment contents of M-register by one via the half-adder and re-enter the incremented contents back into M. Transfer the E-register contents to the L-register.
B. Address the memory from the L-register.
C. Enter the addressed memory location into E.

CLOCK 3

Rewrite the E-register contents into the location in the memory just addressed.

CLOCK 4

Transfer the contents of E-register to L-register. Read into the E-register the contents of the memory location, the address of which is now in the M-register.

The operation which is described is a basic sequence in reading out a word from the scratch-pad portion of the memory. The primary-load command is executed in the above sequence during clock time 3.

A DL address option for a load command calls for the following sequence:

CLOCK 1

The logand previously read in the E-register is rewritten into the memory address held in the M-register.

CLOCK 2

Increment the contents of the M-register by one, using the half-adder. Transfer the logand in the E-register to the L-register. Also transfer the L-register contents to the E-register (to save the L-register contents). The memory address which is held in the L-register is then used to clear this memory address.

CLOCK 3

Write into the memory at the address specified in the L-register the word that has been entered into the E-register as a result of the execution of the primary command.

CLOCK 4

Transfer the contents of the E to the L-register (to save the stored word). Read the next logand into the E-register from the address specified in the M-register.

When an indirect address option is specified, six clock pulses are required to execute the indicated functions. Here an address of an address contains a desired operand; that is, the original memory address contains the address of the desired word, rather than the word itself. The sequence for an IL—load operation—is as follows:

CLOCK 1

E is rewritten into memory under control of M.

CLOCK 2

A. M is incremented to address the next logand.
B. The contents of E (logand) are transferred to L.
C. L addresses the memory (scratch pad), and the contents of this location are read into E.

CLOCK 3

The number read into E is rewritten into memory (scratch-pad address) to restore the original contents.

CLOCK 4

Transfer the contents of E to M (address in scratch pad), and transfer the contents of M (next logand) to P (for storage). The transfer from M to P is through the half-adder, but no addition is performed. Read into E the number in the address specified by M.

CLOCK 5

Rewrite from E into memory to restore the number just read out (the number in E is the desired number for loading).

CLOCK 6

Transfer the next logand (in P) to M. Increment what was in M and transfer it to P. Transfer E to L (to save E's contents and read into E the next logand addressed by M).

The primary command to load would be performed during the clock 5 interval, and the transfer would be from E to one of the other registers, i.e., E to A.

The store operation for an IL address option requires the following sequence:

CLOCK 1

E is rewritten into memory under control of M.

CLOCK 2

M is incremented and returned to M. The logand in E is transferred to L, and L addresses the memory with a read P into E.

CLOCK 3

E contents are rewritten into the memory at the address specified by L.

CLOCK 4

The contents of E are transferred to M. The contents of M are sent via the half-adder, unincremented, to P. The contents of P are transferred to E (for possible transfer to other registers, if desired). The memory location specified by the contents of M is then cleared.

CLOCK 5

E is then written into the memory (this is in accordance with the store primary command).

CLOCK 6

The next logand (in P) is transferred to M. The contents of M (the desired indirect address) is incremented and transferred to P. The contents of E are sent to L, and the next logand is read into E under control of M.

The foregoing operations are representative of the operation of the system and exemplify basic logand cycles. The structure required for effectuating the transfers has been shown in the drawings. The logic signals which are required in order to effectuate the transfers between registers, as well as the circulation of the contents of the register, are shown in the following equations. The terminology to be employed is as has been heretofore described. The letter T represents a transfer. The two letters that follow indicate the transfers. Thus, TAE indicates a transfer of the contents of A-register into the E-register. The logic equation shows to those skilled in the art the structure required for the TAE transfer. The terminology employed in the remainder of the equation is in accordance with that previously shown herein. The terminology, other than that specifying the outputs of the registers and flip-flops, represents the result of collections of signals via gates. The signals collected are shown in the tables following that indicative of the register transfer. Thus, GAO35 represents a signal derived from the simultaneous presence of DL13N and DL11C. Since GAO35 is employed for a number of different purposes, obviously it is advantageous to form the logical combination once for use, wherever required. A further illustration is the signal CRWN. This is derived from the logical combination of signals FCO1N and FSO3N, and FSO1N, and DL15N.

*Logical equations*

TAA=GAO35·GAO10+No data transfer from any other source
TAC=Complement A register contents=CRWN· DL13C·GAO11+CRWN·DL11N·GAO11+CRIA· DL11N·GAOO4
TAE=CWIA·GAOO5·DLO8N+GRPN·DL14C· GAO35+CWPS·GAO19·GAOO9
TAF=CSHF·DL12C·DLO5N·NSTS+CSHF·DLO5N· NSTS·A15C
TAM=CWLA·DEO8N·DEO7N+CWPS·DL14N· DL13N+FLOOC+CWPS·DL12N·DL11N·FLOON +CWPS·GAOO4·DL10N
TAP=CWLA·DE15C·DE14N·DE13N+GRIA· DL11N·FLOON+CRWN·GAO37·GAO10+CWPA· DLO9N·DLO8N·NSCY
TAR=CSHF·DL12C·DLO5C·FSO1C+CSHF·DL13· DL12·DPO1C·FSO1C
TAT=CRIA·DL15C·DL10C·GAOO6·DLO5C +CRHS·DL10N·GAOO6+CRWN·GAO38·GAO10
TEA=CRIA·GAO19·GAOO9+CRPN·GAO35· GAO33+CRWN·DL14N·DL12N·GAO35+CWPS· DL11C·GAOO4
TEE=CRWN·GAO35·GAO13N+CWIS·DL12N· GAO38+No entry from any other source
TEL=CWPA·NDPI+CWLAN
TEM=CRIA·GAO10·GAOO9+CRIA·DL13N· DL10N·FLOON+CRIA·GAO18·DL13N +CWIAN·NSCY+CRPN·GAO36·GAO33 +CRWN·GAO36·GAO19+CRHS·GAO18·DL13C +CWPS·GAO19·DL13C·FLOOC
TEP=CRPN·GAO37·GAO33+CRWN·GAO37· GAO19+CWPS·DL11N·FLOON
TET=CRPN·GAO38·GAO33+CRWN·GAO35· GAO19
TLE=CWLAN·DE14C·DE12C·DEO9C+CWLAN· DE15C·DE14C·DE13C+CSHF·GAFL
TLL+$\overline{\text{TEL}}$·FCO1C·DPOW
TPA+CWLA·DEO8N·DEO7N+CRWN·GAO37· GAO10
TPE=CRIA·GAOO9+CWIAN·DLO8C·GAOO5 +CRPN·GAO37·GAO33+CWPS·GAOO4·DL1ON +CWPS·DL12N·GAOO9
TPM=CWLA·DEO8N·DEO7N+CWIS·DL13C· DL10C·DLO8N+CWIS·DL14N·DL13N+CWPA· DLO9N·DLO8C·NSCY+CWPA·DLO8N·NSLY +CWPS·DLO9C·DLO8N·FLOON+CWPS· DL13N·DL11C·FLOON+CWPS·GAOO9·GAO19
TPP=No entry from any other source=$\overline{\text{TEP}}$·$\overline{\text{CMP}}$· $\overline{\text{TAP}}$·$\overline{\text{TPF}}$·$\overline{\text{TPR}}$
TSE=CIOC·DLO5N·DLO2N
TPR=CSHF·DLO6N·DLO5C·FSO1C
TTA=CRIA·DL15C·GAOO6·DL1OC·DLO5C +CRHS·GAOO6·DL1OC+CRWN·GAO38·GAO10
TTE=CRPN·GAO38·GAOO5+CRPN·GAO38· GAO33+CWBI·FSO1N
TTT=No transfers from other registers=$\overline{\text{TET}}$·$\overline{\text{TAT}}$· $\overline{\text{CIAT}}$·$\overline{\text{CIBT}}$
A15C=DA15N·DE15N
A16C=DA15C·DE15C+DA15C·A15C+DE15C· A15C
CACT=CWPS·GAO19·DL11N·FLOON+CWLA·

Logic equations: Contd.

DE15N·DEO6C+CWLA·DE15N·DEO9N+CWLA·DE15N·DEO8C·DEO7N+CWLA·DE11C·DEO9N+CWLA·DE15C·DE14N·DE13C·DE11N

CIAC=CIOC·DLO6N·DLO1N·GAC51+CWBI·FNTIN·FNTAN·GAC51

CIAE=CIOC·DLO6N·DLO1N·GAC51+CWBI·FNTIN·FNTAN·GAC51

CIAT=CWBI·FNTIN·FNTAN·GAC51

CIBE=CIOC·DLO6N·DLO3N·GAC51+CWBI·FNTIN·FNTAN·GAC51

CIBT=CIOC·DLO6N·DLO3N·GAC51+CWBI·FNTIN·FNTAC·GAC51

CICE=CIOC·DLO6N·DLO2C·GAC51+CWBI·FNTIC

CIOC=GAIOL·DL12N·DL11C

CMA=CWLA·DE15C·DE14N·DE13N+CRIA·DL13N·FLOON·DL10N+CRIA·GAO10·GAO09+CWIA·DLO8N·NSCY+CWPA·DL15N·GAO19·DLO9N·DLO8N+CWPS·GAO37·DLO9N·DLO8N+CWPS·DL14N·DL13N·FLOOL+CWPS·DL11N·FLOON

CME=CRHS·GAO18·DL13C+CRIA·GAO18·DL13N+CRPN·GAO36·GAO33

CMM=No transfers from other registers=$\overline{\text{TEM}}$·$\overline{\text{TPM}}$·$\overline{\text{TAM}}$·FCO1C·$\overline{\text{DPOW}}$ CMP=CWLAN·DE15N·DEO8N+CWLAN·DE13C·DEO8N+CWIAN·DLO8C·NSCY+CWIS·DL14·DL13+CWIS·DL13C·DL10C.DLO8N+CWPA·DLO9N·DLO8C·NSCY+CWPA·DLO9C·DLO8N+CWPS·DL13N·FLOON·DL11C

COUT=GAIOL·DL12C

CRHS=GAO50·FSO1N·FSO2N

CRIA=GAO15·FSO1C·FSO2C

CRPN=GAO50·FSO1N·FSO2C·DL15N

CRWN=FCO1N·FSO3N·FSO1N·DL15N

CSHF=GAO59·FSO2C·DL15C·GAO33

CWBI=GAIOL·DL12N·DL11N

CWIAN=FSO1C·FSO2N·GAO51

CWIS=GAO51·FSO1C·FSO2N·DL15C

CWLAN=GAO51·FSO1N·FSO2N

CWPA=GAO50·FSO2N

CWPS=GAO50·FSO2N·DL15C

DIDRN=IIDA·GAIRA+IIDB·GAIRB+IIDC·FNTIC

DMOO=CRLA·DRCY+CRIA·FZOOC·LD15N+CRIA·FZOOC·DL13L+CACT·CRIA·FZOOC·DL12C+CRPN·FZOOC·DLO5C+CRPN·DLO9N·DLO8C·DLO7N+CACT·CRHS·DL14N·FLOON+CRHS·FLOOC·DL10C·GAO38+CACT·CRHS·FZOOC·DL10N+CSHF·GAO37·DL12N·FSO1C

DODRN=IODA·GAORA+IODB·GAORB+IODC·FNTOC

DPOW=Power Failure Detector—Activated when power has failed and then returned

FDINC=CWPS·GAO18·DL13N·DLO3N

FDINN=CRHS·GAO18·DL13C·DLO3N

FIDRC=CWBI·GAC51+CWBI·FSO1C·GAC57

FIDRN=CWBI·GAC51+CWBI·GAC57

FIINC=CWPS·GAO18·DL13N·DLO3C

FIINN=CRHS·GAO18·DL13C·DLO3C

FLOOC=COND·DLO5N·DLO4C·DLO3C·GAO21·DAO1N+COND·GAO25·GAO22·GASUM+COND·GAO26·GAO20·DE15N+COND·GAO27·GAO20·DA15N+COND·GAO26·GAO23·FTLDN+COND·GAO27·GAO21·DA15C+COND·GAO27·GAO23·A16C+COND·GAO14+CRIA·GAO09·GASUM+CRLA

FLOON=CRIA·DLO15·DL15C·GAO06+CWLA·DE15C·DE13C·DE11C

FNTAC=CIOC·GACHG·DLO1C

FNTAN=CIOC·GACHG·DLO1N

FNTIN=CIOC·GACHG·DLO3N

FNTON=CIOC·GACHG·DLO2N

FODRC=CWPS·GAO12·DL11N·FNTOC+COUT·DL11N·GAC51

FODRN=DODRC

FTLDC=DODRC·FODRC·FNTOC+TTE·FC53N+FNTON·GAC57+COUT·DL11C·GAC57

FTLDN=COUT·DL11N·FTLDC+CWBI·CIAT+CWBI·CIBT+COUT·DLO4C·TET+COUT·FC51N

FZOOK=CWIA·DL15N+CWIS·DL14N·CWPA

FZOON=CWLA·DEO8C·DEO7N

GAO04=DL13N·FZOON

GAO05=DL15·DL14C·DL12C

GAO06=DL13N·DL14N·FLOOC

GAO09=DL11N·FLOON

GAO10=DL14N·DL12N·DL10C

GAO11=DL14N·DL12N·DL10N

GAO13=DL14C·DL12N·DL10C

GAO14=DLO4C·DLO3C·DLO2C·DLO1C

GAO18=DL15C·DL14C·DL10C

GAO19=DL14N·DL12C·DL10C

GAO20=DLO2C·DLO1C

GAO21=DLO2C·DLO1N

GAO22=DLO2N·DLO1C

GAO23=DLO2N·DLO1N

GAO25=DLO5N·DLO4C·DLO3N

GAO26=DLO5N·DLO4N·DLO3C

GAO27=DLO5N·DLO4N·DLO3N

GAO33=DL14C·DL10N

GAO35=DL13N·DL11C

GAO36=DL13N·DL11N

GAO37=DL13C·DL11N

GAO38=DL13C·DL11C

GAO50=FCO1N·FSO3N

GAO51=FCO1N·FSO3C

GAC51=FC53C·FC52C·FC51N

GAC57=FC53N·FC52C·FC51C

GACHG=DLO4N·FODRN·FIDRN

GAFL=DL13C·DL12C·DL11C

GAIDR=DIDRN·FIDRN

GAIOL=DL15C·DL14N·DL10N·FSO3N·FSO2C·FCO1N

GTSB=CACT·FSO2·NISB

NDPI=GAO04

NISM=CWLAN·DE14C·DE12C·DEO9C+CWLAN·DE15C·DE14C·DE13C+CWIAN·GAO05

NPOF=FCO1C·DPOW

NSCY=DL15N·DL13C+DL15C·DL10C

NSTS=GAO14·DL12C+GAFL·DA15C·DA14N+GAFL·DA15N·DA14C

In the preceding list of logical equations the transfers from the M register to the half-adder to other registers employ the gates designated as CMA, CME, CMM, CMP. These indicate the transfer through the respective gates to the designated registers.

In accordance with this invention the computer that has just been described effectively has the capability of performing the operations required for routines respectively designed at Table Search, Match, and Sort, in response to the specification of a single logand for each one of these routines. As pointed out initially, in order to accomplish these operations in other types of computers, it is necessary to provide a command or instruction for substantially each step.

The Table Search logand, abbreviated as TB, is used to compare a given word with each word in a block of consecutive memory locations until a specified test condition is met or until a specified number of words has been compared. A logand containing the TB logand will have the format shown in FIG. 13A.

A Sort logand abbreviated as SR is used to compare a sequence of words in a block to a word in a memory. It also compares each word in the sequence to the succeeding word in the sequence. The Sort logand has the format shown in FIG. 13B.

The Match logand is used to compare corresponding words in two blocks of consecutive memory locations until a specified test condition is satisfied. Logands containing the match logand abbreviated MH, have the format shown in FIG. 13C.

The special command formats all use the IP address option. It may be recalled that this means that the target address is contained in the P register and must be transferred from there into the M register to initiate the particular operation which is commanded.

The special commands are of a type known as conditional special logands since their outcome is in general depedent upon the contents of certain registers and indicators. The first five bit positions DL01 to DL05 in the L register specify one of a number of comparisons to be made or conditions to be tested for in determining the outcome of the logand. The types of comparisons that can be made and the mnemonic abbreviation used to identify them are equality (EQ), greater than (NH), less than (NL), and inequality (NQ). The numbers shown adjacent the types of comparisons are the octal representation thereof. The EQ condition is satisfied if the number in A is the one's complement of the number in E. (This is represented by $A'=E$.) The NH condition is satisfied if the one's complement of the number in the A register is algebraically greater than or equal to the number in the E register.

NL or numeric low is a condition which is satisfied if the one's complement of the number in A is algebraically less than the number in the E register.

NQ represents the condition when the number in the A register is not the one's complement of the number in the E register. The carry indicator for the full adder must be set at Zero for correct comparison for EQ and NQ. The reason for this is so that the output of the carry flip-flop should not be added into the sum being determined by the full adder.

The manner in which this computer determined whether or not two numbers are equal is to convert one of the numbers into its one's complement and then add that to the second number. Except for the situation where the number being one's complemented consists of all Zeros, the one's complement of a number will have a Zero in some digit position thereof. When it is added to a number which equals the value of the number before it was converted to the one's complement form, the sum will consist of all Ones.

FIG. 14 shows a delay flip-flop which constitutes one stage of the A register. This is the same arrangement as shown in FIG. 10 with the exception that a complement gate 449 has been added. The A register has the capability of complementing its contents. It will be recalled that the registers renew their contents on every clock pulse, either by way of circulation of their previous contents or entry of new contents. Upon receipt of a complement signal, each A register complement gate collects the C or reset output of the delay flip-flop with which it is associated and also collects a clock pulse to provide an output which sets the delay flip-flop in its N state. If the A register state was in its N state then it is reset to its C state.

Referring now to FIG. 15, an arrangement is shown for detecting when the numbers in the E register and A register are equal (EQ) or not equal (NQ). The contents of the E register and the A register respectively consisting of a number and the one's complement of a number, are entered into the full adder 24. A gate 450, which is designated in the logic equations of GASUM sense all the sum outputs of all of the stages of the full adder 24. When these are all one, then the gate 450 provides an output which represents the condition EQ. The output of the gate 450 is connected to an inverter 452. The inverter output drives another gate 454, which is represented in the logic equations as NSUM. The inverter applies its output to the gate 454 to which there is also applied an output from the first stage of the L register designated as DL01. DL01 is requisite when looking for NQ. Thus the gate 454 provides the output NQ in the absence of an output from the gate 450. The manner in which the remainder of the computer operates in response to the primary command to determine the presence of these conditions will be shown subsequently herein.

FIG. 16 shows the arrangement of the computer for detecting the conditions NL and NH. For these inspections, consideration is given to the signs of the numbers in the E and A registers as well as to their values. The convention which is adopted for a signed number is to place a one in the 15th digit position for negative numbers, a zero is placed in the 15th digit position for positive numbers. The 15th stage 24A of the full adder 24 adds the signs. A16 the full adder stage 24B is also shown. This stage has as its two sum inputs the complement outputs from the 15th stage of the respective E and A registers, respectively 20A and 14A. The sum inputs of the 15th stage 24A are the N or "1" outputs of the respective 15th E and A register stages and the carry input is the carry output of the 14th stage of the adder.

It should be recalled that the numeric high or NH condition is satisfied if the one's complement of the number in the A register is algebraically greater than or equal to the number in the E register and there is no carry out of the 14th adder stage. The numeric low condition is satisfied if the one's complement of the number in the A register is algebraically less than the number in the E register and there is no carry out of the 14th adder stage. A carry indicator comprising carry flip-flop 456 is provided which is adapted to store the carry output of the highest digit adding stage (14th), of the full adder when necessary. As long as the number in the E register is numerically less than the number which was complemented to become a one's complement in the A register, there will be no carry out of the 14th adder stage.

In obtaining the algebraic highs and lows, it must be remembered that the one's complement number in the A register includes the one's complement of the sign. Thus, when the sign of the one's complement in the A register is negative or one, the number which was "one's complemented" was positive, and vice versa. Therefore, when the 15th stages of E and A registers are both in their zero or C state, both E and A register numbers have a positive sign. The 16th adder stage which is driven by the two C outputs wil produce a carry output. In the presence of a zero or reset indication by the carry flip-flop, it is known that E is algebraically greater than A. In the presence of a one or set indication by the carry flip-flop E is still algebraically greater since the number which was complemented in the A register is negative and E is positive.

This NL test is requested by DL01, DL02, DL03, DL04 and DL05 states of the L register. An AND gate 462 (GAO27) collects the DL03, DL04 and DL05 signals and an AND gate 468 collects the DL01 and DL02 signals. The output of these AND gates together with the carry output of 24B are applied to an AND gate 470, the output of which is the NL condition signal.

Now assume that the 15th state of the E register holds a one and the A register 15th state a zero. This means that both numbers are negative. With no carry indication the number in the A register is algebraically greater than the number in the E register. Should there be a carry indication, then E is greater. Here, however, there will be an output from the carry output of the 16th state and the gate 470 will provide an NL output.

Assume now that there is a "1" in the 15th stage of the A register and a "0" in the 15th stage of the E register. Then both numbers are positive. E is algebraically greater in the presence of a carry and the 16th stage will provide a carry output indicative of this as will gate 470. Otherwise, A is algebraically greater.

Assume that there is a "1" in the 15th stages of the A and E registers. This means A is positive and E is negative. A is always algebraically greater regardless of carry indications. No 16th stage carry output is provided.

Assume that there is "0" in the 15th stages of the A and E registers. This means A is negative and E is positive and consequently E is always algebraically greater.

To detect the NH condition, one need therefore only detect that there is no output from the carry output terminal of the 16th stage. The NH condition is specified by DLO1, DLO2, DLO3, DLO4, DLO5. The latter three outputs are collected by gate 462, the first two by an AND gate 460. The absence of a carry output is detected by an inverter circuit 466. AND gate 464 collects outputs from the inverter 466 and AND gates 460 and 462 to provide the NH condition output.

From the description thus far it should be appreciated that the three routines in accordance with this invention have in common the operation of addressing the memory to bring the word in the target address into the E register. This word is compared with a word in the A register and if the specified condition is met, then the operation is terminated. If the specified condition is not met, then the next readout is occurred to either place two new words in the respective A and E registers for comparison if the routine is of that type, or to place the next new word in the E register for comparing with the word in the A register. The description that follows shows the manner in which the addresses for successive words in the register are obtained and how words are shifted between the register to reach the state at which the tests for the specified condition can be made.

Considering first the Table Search command, it will be recalled that this command is used to compare a given "Search" word with each word in a block of consecutive memory locations, until a specified test condition is met or until a specified number of words have been compared. Before executing the Table Search logand, the A, P and T registers must be loaded as follows: The A register must contain the address "$a$" of the first word in the block of consecutive memory locations to be searched. The T register must contain "$t$," the one's complement of the search word. The P register must contain "$p$" the one's complement of $a+n$, where $n$ is the number of words in the block. In addition, the carry flip-flop must be set to zero.

In executing the Table Search logand the search word is compared with the contents of memory locations $a$, $a+1$, $a+2$, etc., until one of two conditions is satisfied. The first condition is that the specified test condition (EQ, NH, NL, and NQ), is satisfied by the contents within the contents of $a+K-1$, $k=1, 2, \ldots n$. When the test for this condition is made, the A register contains the complemented search word (i.e. the initial contents of T); and the E register contains $(a+k)$. If the logand terminates under this condition, the overflow indicator is unchanged. The address $a+k$ is left in A. And the contents of $a+k$ are left in L. The second condition is that the address of the word to be compared next equals $a+n$. Under this condition, the overflow indicator is set to 1. The A register holds $a+n$, and the L register holds the contents of the memory at the address $a+n$.

In order to simplify an understanding of the sequence of memory readout and write-in and register transfers which occur in the Table Search, these have been set forth in Table I shown below. The respective headings for this table consist of the clock time, the operation occurring at those clock times, the designations L, E, A, P, M, T, which respectively refer to the contents of those registers.

TABLE I

| Clock | Operation | L | E | A | P | M | T | |
|---|---|---|---|---|---|---|---|---|
| RL1 | wrm | l | (m) | a | p | m | t | |
| WL2 | apmia, ele | (m) | l | m+1 | a | p | | |
| RI3 | ata | | | t | | | m+1 | |
| WI4 | pmp, rdm | | (a) | | p | a | | (a)→E |
| RP5 | wrm | | | | | | | |
| WP6 | test, epe, amia | | p | a+1 | (a) | t | | |
| RI3 | test, emape | | (a) | t | a+1 | p | | |
| WI4 | pmp, rdm | | (a+1) | | p | a+1 | | (a+1)→E |
| RP5 | wrm | | | | | | | |
| WP6 | test, epe, amia | | p | a+2 | (a+1) | t | | |
| . | . | . | . | . | . | . | | |
| . | . | . | . | . | . | . | | |
| . | . | . | . | . | . | . | | |
| RI3 | test, emape | | (a+(n−1)) | t | a+n | p | | |
| WI4 | pmp, rdm | | (a+n) | | p | a+n | | |
| RP5 | wrm | | | | | | | |
| 6 | test, ata | | | m+1 | | | t | |
| 6 | ama, el, rdm | a+n | (m+1) | a+n | p | m+1 | t | |

The operations shown in Table I are specified by the table search logand shown in FIG. 13A. The conventions adopted in setting up the table will become clear as the description progresses.

From the description of the computer given heretofore, it will be understood that the operation occurs in response to the clock pulse sequence, the state counter sequence, the signals collected from the L register, and the signals indicative of the testing for the conditions specified.

Assume at the outset that the various registers have been loaded with the specified information required before executing the table search logand. The manner of loading these registers has been described previously in connection with the description of the computer. Accordingly, upon the occurrence of the first clock pulse at the RL state of the state counter the respective LEAPMT registers contain $l$, which was a result of the preceding logand $(m)$, which is the table search logand which has been read out of the memory, "$a$," which is the address of the first word in the block to be searched, "$p$," which is the one's complement of "$a+n$," where "$n$" is the number of words in the block, "$m$," which is the address of the logand presently contained in the E register, and "$t$," which is the one's complement of the search word.

The operation $wrm$ specified in the operation column adjacent to the first clock time means that there should be written back into the memory under control of the M register the contents of the E register. Thereby, the contents of the E register which were read out from the memory are restored to the address location from whence they were read out. The contents of the E register are not lost thereby but are still maintained in the register.

Upon the occurrence of the second clock pulse together with the WI state of the state counter, the operation specified is *apmia, elc*. This means that the contents of the A register will be transferred into the P register. The contents of the P register will be transferred into the M register. The contents of the M register will be incremented and then transferred into the A register. The contents of the E register will be transferred into the L register and the contents of the L register will be transferred into the E register. As a result the logand (*m*) is now in the L register to be decoded. In the E register there is *l*, representing the contents of the L register. In the A register there is now *m*+1 which is the address of the logand to be executed at the completion of the table search logand presently being executed. In the P register there is *a*, the previous contents of the A register. In the M register there is *p*, the previous contents of the P register. Upon the occurrence of the third clock pulse during the RI state of the state counter the transfer *ata* occurs. At this point it should be noted that where no letter is shown in the register column the contents of that register remain as indicated by the last letter in that column. The transfer *ata* results in the contents of the T register *t* being in the A register and the contents of the A register, *m*+1, now being in the T register.

Upon the occurrence of the fourth clock pulse and the WI state of the state counter, the transfer *pmp* occurs and also the operation *rdm* which means "read from the memory under control of the address in the M register." The *pmp* transfers result in the contents of the P register being transferred into the M register whereby the M register now has *a*. The contents of the M register are transferred unincremented into the P register whereby the P register now has *p*. At this time also the readout from memory occurs under control of the address which is in the M register which is *a*. Thus the contents of the address in the memory designated by *a* are represented under the E register column as (*a*) and the previous contents of the E register are discarded. The occurrence of the readout is indicated in the column at the right by the (*a*) and the arrow indicating that contents of the address designated by *a* are now in the E register.

At clock five time and at RP time of the state counter, the information which has been read from the memory is written back in the same location. This is indicated by *wrm*. Thus the contents of the E register are now written back in the memory at the address in the M register which is *a*. At this time the A register contains the one's complement of the search word and the E register contains the first word in the table stored in the memory with which a comparison is to be made. Therefore, upon the next clock pulse time, a test is made for the occurrence of equality indicating end of operation. Also there is a transfer as indicated in the operation column, *epe* and *amia*. As indicated, this means the contents of the E register are placed in the P register and the contents of the P register are placed in the E register. The contents of the A register are transferred to the M register. The previous contents of the M register are incremented and inserted into the A register. As a result, the register contents are as shown under the respective register columns.

The next operation occurs on the clock pulse designated as the third clock pulse which corresponds with the RI state of the state counter. The state counter, for the duration of the logand need not cycle through RL and WL states, but cycles through RI, WI, RP, and WP states. Furthermore, the operations which occur during the first and second clock pulses need not be repeated in carrying out the logand specified. The third clock operation this time specifies the register transfers *emape* and then *test*. This places the contents of the first memory cell which was read out in the E register and the one's complement word to be compared therewith in the A register. The test then occurs and if satisfactory the operation runs out in a manner to be described. If not, then the operation specified by the fourth clock pulse occurs.

The operation occurring at this fourth clock pulse is a register transfer operation *pmp*, and also a readout from the memory from the address in the M register which is *a*+1 (received from the E register). Accordingly, the contents of the E register at this time will be the word (*a*+1) which was at the address *a*+1 in the memory.

The next operation on the fifth clock pulse is a writing operation wherein the information read from the memory is restored to the same address therein. The test word *t* can then be compared with the new word which has been read out from the memory. This occurs on the next clock pulse. Also, there is a transfer *epe* and *amia*. This puts the E register contents in the P register and the P register contents in the E register, and also increments by one the original contents of the A register and restores them back into the A register.

The cyclic operation including clock steps three, four, five, and six, just described, continues until the condition specified in the logand is satisfied. It will be noted that two testing steps occur during a cycle. One testing step on the third clock pulse is for address equality and the other testing step on the sixth clock pulse is for data comparison. The operation of table search terminates on either an address equality whereby it is known that the condition specified has not been found in the block being searched, or upon the test of the data. If termination is due to address equality an overflow flip-flop is set to one. If termination occurs as a result of data comparison, then the operation which occurs is as shown at the bottom of the table. There is a transfer *ata* whereby the search word *t* is restored to the T register and the contents of the T register which stored the address *m*+1 of the next logand, are put into the A register. Then a readout operation occurs and also a transfer *ama, el*. The readout operation is from the *m*+1 address of the memory which places the next logand (*m*+1) in the E register and *a*+*n* in the L register which is the address of the last word read in the test block of words in the memory.

FIG. 17 is a schematic diagram illustrating the gating arrangements required for carrying out the operations specfied in Table I. AND gate 480 collects the signals from the L register, DL15, DL14, DL13, DL12, DL11, DL10, which command the table look-up routine. The output of this gate is applied to a plurality of AND gates 482 through 494. Each one of these gates also collects a different one of the clock pulses from a six-phase clock pulse generator 495. This may be a cyclic counter driven from a clock pulse source. The sixth clock pulse drives a flip-flop 498 to its set state at which the ouput is a signal designated as CFN. The flip-flop when in its reset state provides an output signal CFC.

AND gate 482 therefore collects signals RL, from the state counter CL1, the first output of the generator 495 and CFC. The output of AND gate 482 initiates the operation *wrm* (see Table I).

After the first six clock pulse outputs, which together with the other indicated signals successively energize gates 482 to 489, the flip-flop 498 is driven to its set state. Thus gates 490 through 493 can now be energized on the occurrence of clock pulses 3 through 6. These gates can then signal to the remainder of the computer to proceed with the operations specified at their outputs and as shown in Table I. Upon the occurrence of one of the conditions specified by the states of the first five stages of the L register, then an OR gate 500, to which is applied the output signifying the occurrence of the specified condition, can apply a signal to AND gate 502 which then resets flip-flop 498 and AND gate 494. This AND gate signals to the computer to perform the terminating function *ama el rdm* instead of the function *ata* specified by AND gate 493.

In accordance with this invention the computer in response to only a single command compares corresponding words in two blocks of consecutive memory locations until a specified test condition is satisfied. The logand which calls forth this operation is the Match logand, whose format is shown in FIG. 13C. Table II specifies the cycle operations which occur in order to effectuate this logand.

See Table II which follows:

TABLE II

| Clock | Operation | L | E | A | P | M | T |
|-------|-----------|---|---|---|---|---|---|
| RL1 | wrm | 1 | (m) | a | p | m | t |
| WL2 | apmia, el, rdm | (m) | (p) | m+1 | a | p | |
| RI3 | wrm, ata | | | | | | m+1 |
| WI4 | pmip, rdm | | (a) | | p+1 | a | |
| RP5 | wrm | | | | | | |
| WP6 | pmip, ea, rdm | | (p+1) | (a) | a+1 | p+1 | |
| RI3 | wrm, cpa, test | | | (a)′ | | | |
| WI4 | pmip, rdm | | (a+1) | | p+2 | a+1 | |
| RP5 | wrm | | | | | | |
| WP6 | pmip, ea, rdm | | (p+2) | (a+1) | a+2 | p+2 | |
| . | . | . | . | . | . | . | . |
| . | . | . | . | . | . | . | . |
| . | . | . | . | . | . | . | . |
| RI3 | wrm, cpa, test | | (p+n) | (a+n−1)′ | a+n | p+n | |
| WI4 | pmip, rdm | | (a+n) | | p+n+1 | a+n | |
| RP5 | wrm, ata | | | m+1 | | | (a+n)′ |
| WP6 | ama, el, rdm | (a+n) | (m+1) | a+n | p+n+1 | m+1 | (a+n)′ |

The terminology employed in Table II should be clear after the preceding explanation of Table I. Before executing the match logand the A register must be loaded with the address $a$ of the first word of the first block and the P register must be loaded with the address $p$ which is one less than the first word of the second block. In executing the logand, the contents of location $a$ are compared with the contents of location $p+1$, the contents of $a+1$ with the contents of locations $p+2$, etc. until the specified test condition is satisfied. When the test for this condition is made, the A register contains the one's complement of $(a+i)$ and the E register contains $(p+i+1)$. If the test is satisfied by the word pair $(a+k-1)$ and $(p+k)$ then, at the termination of the logand, register P will contain $(p+k)$, register A will contain $(a+k-1)$, register T will contain the one's complement of $(a+k)$ and register L will contain $(a+k)$.

Considering now the table in more detail, upon the occurrence of the first clock cycle the logand which has been read out of the memory is restored back into the memory at the address from which it was taken. Upon the occurrence of the second clock pulse in the cycle the transfer *apmia*, and *el* takes place and also there is a readout from the memory from the target address which has been transferred into the M register by the operation specified. This places the first word of the first block to be compared in the E register. The next operation restores this first word in the memory from which it was read and at the same time transfers the address from the logand to be performed after this one is terminated in the T register for holding.

The operation upon the fourth clock pulse places the address of the first word in the second block in the M register so that the readout from memory produces this first word $(a)$, which is entered into the E register. Upon the occurrence of the fifth clock pulse the word just read from the memory is restored into its position in the memory.

Upon the occurrence of the sixth clock pulse the operation *pmip, ea,* and *rdm*, occurs. This places the contents of the $p+1$ cell in the memory in the E register and the contents of the $a$ cell of the memory is inserted in the A register. The address $a$ is incremented by one and entered into the P register and the M register now contains the address $p+1$.

However, a comparison cannot take place unless and until the first word of the first block to be compared $(a)$ is complemented with respect to one. The A register has this capability. Therefore, upon the commencement of the third clock pulse following the sixth clock pulse of the first cycle the word which was read into the E register $(p+1)$, is written back into the location from which it was extracted. Since the complementing operation has taken place in the A register, and since the E register contains the first word of the second block, a comparison of the two can take place to determine whether these two words meet the conditions specified in the logand. It should be noted at this point that the symbol $(a)'$ means the complement of the contents of the memory whose address is $a$.

Regardless of whether or not the conditions specified are met at test the computer will continue through clock cycles four, five and six. However, the operations which occur during these clock cycles differ when the test is satisfied from what it is when the test is not satisfied.

When the test is not satisfied then, as shown in the table, upon the occurrence of the fourth clock pulse, the transfers *pmip* occur, and also there is a readout of the word at the address entered into the M register from the P register. This word is the contents of the $a+1$ cell in the memory. Also the incrementing operation of the M register increases the address of the $p$ block of words in the memory. The fifth clock pulse results in the restoration of the contents of the cell $a+1$ in the memory.

During the sixth clock pulse the second word in the "$a$" block in the memory is transferred into the A register and the second word in the $p$ block in the memory is read into the E register.

As indicated above, the computer will continue to cycle in the manner indicated by the second set of clock pulses three, four, five and six, performing the operations indicated, successively reading words out of each block, placing these words in the registers, complementing the word in the A register and then inspecting the sum of these words whereby the presence of the test condition may be inspected. The computer then operates to increment the address signals of the respective word blocks so that the succeeding words from these two blocks may be read out.

Upon the occurrence of a test during the last cycle the operation of the computer during clock pulses three and four is the same as has been described. On the fifth clock pulse, the contents of the A and T registers are interchanged whereby the address of the next logand to be performed is removed from the T register and placed in the A register and the complemented word in the A register which was the last word of the $a$ block, is placed in the T register. Upon the sixth clock pulse the operation *ama, el,* and *rdm*, occurs. This results in the entry into the M register of the address of the next logand to be performed so that it can be read out into the E register. The word in the *a* block and the word in the *p* block which met the test condition are respectively entered into the L and P registers.

FIG. 18 shows a logical gating arrangement for collecting signals to order the computer through the match routine as described in Table II. The arrangement of gates is the same as described in FIG. 17. Similar functioning apparatuses use the same reference numerals. The AND gate 504 collects signals DL15, DL14, DL13, DL12, DL11, DL10 signifying the match routine. AND gates 505 through 514 carry out the functions of collecting signals from the output of gate 504, from the output of the computer state counter, from the outputs of the clock pulse generator 495 and from the outputs of flip-flop 498 and sequencing the computer through the operations as specified in Table II.

AND gates 515 and 516 perform the terminating operations upon the completion of a successful match as specified by the condition in the L register. These two AND gates respectively receive the fifth and sixth clock pulses as well as the outputs RP and WP of the state counter and the output of OR gate 500. AND gate 515 signals the operation *wrm, ata* and AND gate 516 signals the operation *ama, rdm*.

The Sort logand, as represented in FIG. 13B, is one which is used to compare a sequence of words in a block to a word in a memory. It also compares each word in the sequence to the succeeding word in the sequence.

Before executing the Sort logand the A register must be loaded with the address of the first word in the block *a*. The P register must be loaded with *p*, the address of the word in memory to be compared. In executing the logand the contents of location *a* are compared first with the contents of location *p*, then with the contents of location $a+1$, the contents of $a+1$ are compared with the contents of *p* and then with the contents of $a+2$, etc., until the specified condition is satisfied. When the test for the condition is made, the A register will contain $(a+i)'$ and the E register contains first $(p)$ and then $(a+i+1)$. At the termination of the logand, the P register will contain *p*, the A register will contain $a+n$, the T register will contain $(a+n-1)'$, and the L register will contain $(a+n)$.

If the termination is caused by an $(a+i)$ and $(a+i+1)$ comparison, the carry indicator will be set to one. If the comparison of $(a+i)$ and $(p)$ causes the termination the carry indicator is unchanged.

Table III, shown hereunder, specifies the operation cycles which occur in the carrying out of the sort logand. Its terminology should be clear from the foregoing descriptions.

The next clock pulse enables a readout from the memory of the word whose address is *p* and increments the address *m* to provide the address of the logand to be performed upon the completion of the current one.

Upon the occurrence of the third clock pulse the computer restores the word $(p)$ read out of the memory and stores the address of the next logand in the T register.

Upon the occurrence of the fourth clock pulse the computer reads out of memory the first word of the *a* block $(a)$. Upon the occurrence of the fifth clock pulse this word is written back into the memory. Upon the occurrence of the sixth clock pulse the address *p* is entered into the M register and then $(p)$ is read out from the memory. The contents $(a)$ of the E register are transferred to the A register to make room for the incoming $(p)$.

The succeeding cycle starts with the third clock pulse at which time $(p)$ is restored in the memory and the first word of the *a* block is complemented in the A register to provide $(a)'$.

Upon the occurrence of the fourth clock pulse in the second cycle the complemented word in the A register and the word in the E register are compared by the full adder to determine whether the conditions specified by the logand are present. There is also a reciprocal transfer between the P register and the M register and between the M register and the P register. Then there is a readout of the word $(a+1)$ from the address specified in the M register. This is the next word in the "*a*" block in the memory.

On the occurrence of the next clock pulse, the fifth clock pulse, the word $(a+1)$ which has been read out of the memory is restored at the $a+1$ address. Upon the occurrence of the sixth clock pulse there is a transfer between the E and A registers whereupon the word $(a+1)$ is entered into the A register. Also, the contents of the P register *p*, are entered into the M register to serve as the address for reading the word $(p)$ out of the memory again. The M register contents are incremented and transferred into the P register. Finally, the full adder compares the contents of the E and A registers to determine whether or not the conditions specified in the logand are present. The E and A register contents are at this time respectively $(p)$ and $(a+1)$.

It will be noted that on the fourth clock pulse of the second cycle a test occurs of the contents of the $a+1$ location in the memory with the contents of the location *a* in their complemented form, and upon the occurrence of the sixth clock pulse a test occurs of the contents of the location *p* of the memory with the contents of the location $a+1$ of the memory. The computer continues

TABLE III

| Clock | Operation | L | E | A | P | M | T |
|-------|-----------|---|---|---|---|---|---|
| RL1 | wrm | 1 | (m) | a | p | m | t |
| WL2 | apmia, el, rdm | (m) | (p) | m+1 | a | p | |
| RI3 | wrm, ata | | | t | | | m+1 |
| WI4 | pmp, rdm | | (a) | | p | a | |
| RP5 | wrm | | | | | | |
| WP6 | pmip, ea, rdm | | (p) | (a) | a+1 | p | |
| RI3 | wrm, cpa | | | (a)' | | | |
| WI4 | pmp, rdm, test | | (a+1) | | p | a+1 | |
| RP5 | wrm | | | | | | |
| WP6 | pmip, ea, rdm, test | | (p) | (a+1) | a+2 | p | |
| . | . | | | . | | | |
| . | . | | | . | | | |
| . | . | | | . | | | |
| RI3 | wrm, cpa | | (p) | (a+n−1)' | a+n | p | |
| WI4 | pmp, rdm, test | | (a+n) | | p | a+n | |
| RP5 | wrm, ata | | | m+1 | | | (a+n−1)' |
| WP6 | ama, el, rdm | (a+n) | (m+1) | a+n | p | m+1 | |

With the data entered into the various registers as indicated, upon the occurrence of the first clock pulse, as in previous operations, there is restored in the memory the contents of the last memory cell from which a readout took place.

to cycle in the manner recited until the test condition is satisfied. The terminating test cycle, or the test cycle at which a specified condition occurs, is the last test cycle shown in the Table III. At clock pulse time three the contents of the memory at the *p* location are restored and the contents of the A register are complemented. The contents of the A register are the next to the last word which has been read from the a block. At clock pulse time four there is a readout from the memory from the address specified in the M register which is the last word in the a block. The address of the word p, is preserved in the P register.

Upon the occurrence of the fifth clock pulse the word that has been read out is restored in the memory and a transfer occurs between the A and T registers and the T and A registers resulting in the next logand being entered into the A register and a complemented next to the last word in the a block being transferred to the T register. Upon the occurrence of the sixth clock pulse, the A register contents are transferred to the M register and the M register contents are transferred to the A register unincremented. The contents of the E register are transferred to the L register and a readout occurs from memory into the L register in response to the address in the M register. The word in the E register is now the next logand to be executed.

FIG. 19 shows the logical gating arrangement for collecting signals for the sort routine. The gating arrangement is similar to that shown in FIGS. 17 and 18. AND gate 518 collects the L register signals signifying the sort command. These are DL15, DL14, DL13, DL12, DL11 and DL10. AND gates 520 through 529 collect the state counter, clock pulse generator and flip-flop 498 outputs in response to which these AND gates provide outputs which cause the computer to operate in the manner indicated. AND gates 530 and 531 are the terminating AND gates which, upon the occurrence of a successful test cause the operations specified at their outputs instead of those of AND gates 528 and 529.

It will be noted that the three routines described above are variations of one another. They all have the common operations of entering the words to be compared into the E and A registers. One or both words are obtained from the memory. All of the required transfers between registers, memory readout and restoration are operations which the computer described performs. The logic for obtaining these operations is as described and shown in the preceding description of the computer. The sequencing of these operations to achieve the routines specified is achieved by logic gates which in response to the octal codes shown for the routines sequence the computer structure to perform the various required operations.

The embodiments of the invention in which an exclusive property or privilege is claimed are defined as follows:

1. In a data processing system having a memory including a plurality of locations each respectively storing either an instruction or a data word;
   a plurality of registers;
   means for selectively accessing one of said instruction words from said memory and for storing said instruction word in a first of said registers;
   means for identifying a first data word stored in said memory;
   means for accesing said first data word from said memory;
   means for storing a test data word in a second of said registers;
   means for comparing said first and test data words in accordance with a comparison criteria defined by said accessed instruction word and for generating a signal when said comparison satisfies said criteria; and
   means responsive to said accessed instruction word stored in said first register and to the absence of said signal for sequentially identifying and accessing other data words stored in said memory and for sequentially comparing said other data words with the data word stored in said second register.

2. In a data processing system having a memory including a plurality of locations each respectively storing either an instruction or a data word;
   a plurality of registers;
   means for selectively accessing one of said instruction words from said memory and for storing said instruction word in a first of said registers;
   means for identifying a first data word stored in said memory;
   means for identifying an Nth data word stored in said memory;
   means for accessing said first data word from said memory;
   means for storing a test data word in a second of said registers;
   means for comparing said first and test data words in accordance with a comparison criteria defined by said accessed instruction word and for generating a first signal when said comparison satisfies said criteria;
   a clock pulse source; and
   means responsive to a clock pulse and the absence of said first signal for identifying and sequentially accessing data words stored in said memory subsequent to said first and prior to said Nth data word and for sequentially comparing each of said accessed data words with the data word stored in said second register.

3. The data processing apparatus of claim 2 wherein said means for identifying and sequentially accessing data words stored in said memory subsequent to said first and prior to said Nth data word includes a memory address register;
   means for storing an address in said memory address register identifying the memory location storing said first data word; and
   wherein said means responsive to a clock pulse and the absence of said first signal comprises means for incrementing said address stored in said address register.

4. The data processing apparatus of claim 2 including means for sequentially accessing test words from said memory and sequentially storing said accessed test words in said second register in response to a clock pulse and the absence of said first signal.

5. In a data processing system having a memory including a plurality of locations each respectively storing either an instruction or a data word;
   a plurality of registers;
   means for selectively accessing one of said instruction words from said memory and for storing said instruction word in a first of said registers;
   means for identifying a first data word in a first block of data words stored in said memory;
   means for identifying a first data word in a second block of data words stored in said memory;
   means for comparing said identified first data words in accordance with a comparison criteria defined by said accessed instruction word and for generating a first signal when said comparison satisfies said criteria;
   a clock pulse source;
   means responsive to a clock pulse and the absence of said first signal for sequentially accessing data words stored in said memory subsequent to said first data words from both said first and second blocks; and
   means for comparing said sequentially accessed data words from said first block with said sequentially accessed data words from said second block in accordance with said criteria.

6. The data processing apparatus of claim 5 including means for identifying an Nth data word stored in said memory; and
   means responsive to the accessing of said Nth data word for inhibiting further accessing.

7. The data processing apparatus of claim 5 wherein said means for sequentially accessing data words stored in said memory includes a memory address register;
   means for storing an address in said memory address register identifying the memory location storing said first data word; and wherein said means responsive to a clock pulse and the absence of said first signal comprises means for incrementing said address stored in said address register.

8. The data processing apparatus of claim 5 wherein said data words are compared for equality in accordance with said criteria defined by said accessed instruction word.

9. The data processing apparatus of claim 5 wherein the magnitude of said data words are compared in accordance with said criteria defined by said accessed instruction word.

10. In a computer of the type having a memory wherein there is stored a block of signal sets representative of words $(a)$ to $(a+n)$ where $n=0, 1, 2 \ldots n$ each word being represented by a separate signal set respectively stored at addresses $a$ to $a+n$, and it is desired to compare each one of these words to a signal set representative of a word $(t)$ to determine the presence of a predetermined condition, means for executing a comparison operation comprising:

a first register;

means for entering a single command signal set into said first register specifiying said predetermined condition;

means responsive to said single command signal set for making said comparison including a second register and a third register;

means for comparing the contents of said second and third registers to test for the presence of said predetermined condition;

means to which a signal set is applied for generating successive address signal sets respectively identifying memory addresses between $a$ and $a+n$;

means for successively reading words out of said memory into said second register responsive to said successively generated address signal sets;

means for entering said signal set representative of said word $(t)$ into said third register, said comparing means being operative each time a word is read from said memory into said second register; and means for terminaitng said operation upon the occurrence of said predetermined condition.

11. The computer of claim 10 including a fourth register;

means for entering a signal set representative of a termination address in said fourth register;

means for comparing said incremented address signal sets with said signal set in said fourth register; and means for terminating said operation in response to an incremented address signal set being identical to said signal set in said fourth register.

12. In a computer of the type having a memory wherein there is stored a first block of signal sets representative of a first block of words $(a)$ to $(a+n)$ where $n=0, 1, 2 \ldots n$, and a second block of signal sets representative of a second block of words $(p)$ to $(p+n)$ each word being respectively stored at addresses $a$ to $a+n$ and $p$ to $p+n$ and it is desired to compare each of the words in the first block to a corresponding word in the second block to determine the existence of a predetermined condition, means for excuting a comparison operation comprising:

a first register;

means for entering a single command signal set into said first register representative of a command to perform said comparison operation and specifying said predetermined condition;

means responsive to said single command signal set for making said comparison including a second register and a third register;

means for comparing the contents of said second and third registers to test for the presence of said predetermined condition;

address incrementing means to which a signal set representative of an address is applied for incrementing that signal set to thereby provide another signal set representative of the next address;

readout means for reading from said memory into said second register a word stored at an address responsive to a signal set representative of said address;

means for applying a signal set representative of an address $p$ in said second block of words to said readout means to enter the word $(p)$ into said second register;

means for applying a signal set representative of address $a$ to said readout means to read out the word $(a)$ into said third register whereby said means for comparing can test for said predetermined condition;

means for successively applying signal sets representative of addresses of words in said second block to said address incrementing means to successively obtain the addresses of succeeding words in said second block of words;

means for successively applying said signal sets representative of addresses of the succeeding words in said second block to said readout means to successively read said succeeding words into said second register;

means for successively applying signal sets representative of addresses of words in said second block to said address incrementing means to successively obtain the addresses of succeeding words in the first block of words;

means for successively applying said signal set representative of the address of the succeeding word in said first block to said readout means to successively read said succeeding word into said third register whereby said means for comparing performs a comparison for the predetermined condition; and means for terminating said operation upon the occurrence of said predetermined condition.

13. The computer of claim 12 including a fourth register;

means for entering a signal set representative of a termination address in said fourth register;

means for comparing the signal sets representing said successively obtained addresses of succeeding words in said second block with said signal set in said fourth register; and means for terminating said operation in response to an obtained signal set representative of a second block word address being identical to said signal set in said fourth register.

14. In a computer of the type having a memory wherein there is stored a block of signal sets, representative of words $(a)$ to $(a+n)$ where $n=0, 1, 2 \ldots n$, at addresses in said memory specified by address signal sets $a$ to $a+n$, and it is desired to compare each of the words $(a)$ to $(a+n)$ with the succeeding word $(a+n)$ to determine the presence of said predetermined condition, means for executing a comparison operation comprising:

a first register;

means for entering a single command signal set into said first register including signals specifying said predetermined condition;

means responsive to said single command signal set in said first register for effectuating said comparisons including a second register, and a third register;

means for comparing the contents of said second and third registers to test for the presence of said predetermined condition;

readout means for reading from said memory into said second register a word stored at an address responsive to a signal set representative of said address;

means for applying a signal set representing a first address between $a$ and $a+n$ to said readout means to read a first word into said second register from said memory;

means for incrementing said signal set representative of said first address to thereby obtain a signal set representative of a second address;
means for transferring said first word into said third register;
means for applying said signal set representative of said second address to said read out means to read a second word into said second register whereby said means for comparing compares the contents of said second and third registers for said predetermined condition; and
means for terminating said operation in response to a generated address signal set being identical to said signal set in said fourth register.

15. The computer of claim 14 including a fourth register;
means for entering a signal set representative of a termination address in said fourth register;
means for comparing said incremented address signal sets with said signal set in said fourth register; and
means for terminating said operation in response to an incremented address signal set being identical to said signal set in said fourth register.

References Cited

UNITED STATES PATENTS

| | | | |
|---|---|---|---|
| 3,030,609 | 4/1962 | Albrecht | 340—172.5 |
| 3,221,308 | 11/1965 | Peterson | 340—172.5 |
| 3,253,134 | 5/1966 | North | 235—177 |

PAUL J. HENON, *Acting Primary Examiner.*

P. L. BERGER, *Assistant Examiner.*

Disclaimer 3,364,471.—*Milton G. Bienhoff* and *Edward J. Schneberger*, Canoga Park, Calif. DATA PROCESSING APPARATUS. Patent dated Jan. 16, 1968. Disclaimer filed Sept. 17, 1970, by the inventors; the assignee, *The Bunker-Ramo Corporation*, concurring.

Hereby enter this disclaimer to claim 1 of said patent.

[*Official Gazette October 20, 1970.*]